US006823017B1

(12) United States Patent
Davis et al.

(10) Patent No.: US 6,823,017 B1
(45) Date of Patent: Nov. 23, 2004

(54) SYSTEMS, METHODS AND COMPUTER PROGRAM PRODUCTS FOR FILTERING GLITCHES FROM MEASURED VALUES IN A SEQUENCE OF CODE POINTS

(75) Inventors: Gordon Taylor Davis, Chapel Hill, NC (US); Fredy D. Neeser, Langnau (CH); Malcolm Scott Ware, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/432,023

(22) Filed: Oct. 29, 1999

(51) Int. Cl.[7] .............................................. H04B 14/06

(52) U.S. Cl. ...................... 375/245; 375/242; 375/341; 375/350; 708/300

(58) Field of Search ................................ 375/245, 242, 375/243, 244, 341, 350; 708/300

(56) References Cited

U.S. PATENT DOCUMENTS

| 3,557,308 A | 1/1971 | Alexander et al. ......... 178/69.5 |
| 3,622,877 A | 11/1971 | MacDavid et al. ....... 324/73 R |

(List continued on next page.)

FOREIGN PATENT DOCUMENTS

| EP | 0 473 116 A2 | 8/1991 | ............ H04N/1/00 |
| EP | 0 659 007 A2 | 11/1994 | .......... H04M/11/06 |
| EP | 0 669 740 A2 | 12/1994 | ............ H04L/27/00 |
| WO | WO 96/18261 | 6/1996 | .......... H04M/11/00 |
| WO | WO 98/37657 | 8/1998 | |

OTHER PUBLICATIONS

Erup, et al., Interpolation in Digital Modems—Part II: Implementation and Performance, *IEEE Transactions on Communications,* vol. 41, No. 6, pp. 998–1008 (Jun. 1993).
Fischer, Signal Mapping for PCM Modems, *V–pcm Rapporteur Meeting,* Sunriver, Oregon, USA,, 5 pgs. (Sep. 4–12, 1997).

(List continued on next page.)

*Primary Examiner*—Mohammed Ghayour
*Assistant Examiner*—Pankaj Kumar
(74) *Attorney, Agent, or Firm*—Myers, Bigel, Sibley & Sajovec, P.A.; Scott W. Reid

(57) ABSTRACT

Glitch filters, methods, and computer program products that utilize the generally monotonically increasing characteristics of the expected levels of code points to detect and remove noise spikes by replacing values in the code point sequence with new values based on the code points around a suspect value are provided. Measured values associated with two code points in the sequence of code points which are immediately higher in the sequence of code points than a code point of interest are evaluated so as to select a larger value of the two code points in the sequence as a first reference value. The first reference value is compared with a measured value associated with a code point in the sequence of code points immediately lower than the code point of interest to determine if the first reference value is smaller than the measured value associated with the code point in the sequence of code points immediately lower than the code point of interest. The smaller of the first reference value and the measured value associated with a code point in the sequence of code points immediately lower than the code point of interest is then selected so as to provide a first replacement value. The measured value associated with the code point of interest is then replaced with the first replacement value if the first reference value is smaller than the measured value associated with the code point of interest.

19 Claims, 4 Drawing Sheets

U.S. PATENT DOCUMENTS

| | | |
|---|---|---|
| 3,683,120 A | 8/1972 | Schenkel .................. 179/15 A |
| 3,729,717 A | 4/1973 | de Koe et al. .......... 340/172.5 |
| 4,112,427 A | 9/1978 | Hofer et al. ................ 340/347 |
| 4,132,242 A | 1/1979 | Carroll, Jr. .................. 137/263 |
| 4,208,630 A | 6/1980 | Martinez ....................... 375/7 |
| 4,237,552 A | 12/1980 | Aikoh et al. ................... 370/83 |
| 4,270,027 A | 5/1981 | Agrawal et al. .......... 179/81 R |
| 4,434,322 A | 2/1984 | Ferrell .................... 178/22.13 |
| 4,450,556 A | 5/1984 | Boleda et al. ................. 370/58 |
| 4,577,310 A | 3/1986 | Korsky et al. ................. 370/58 |
| 4,578,796 A | 3/1986 | Charalambous et al. ....... 375/8 |
| 4,720,861 A | 1/1988 | Bertrand ..................... 381/36 |
| 4,731,816 A | 3/1988 | Hughes-Hartogs .......... 379/98 |
| 4,756,007 A | 7/1988 | Qureshi et al. ............... 375/37 |
| 4,760,598 A | 7/1988 | Ferrell ......................... 380/44 |
| 4,797,898 A | 1/1989 | Martinez ....................... 375/7 |
| 4,833,706 A | 5/1989 | Hughes-Hartogs .......... 379/98 |
| 4,868,863 A | 9/1989 | Hartley et al. ............... 379/98 |
| 4,884,285 A | 11/1989 | Heynen et al. ............... 375/25 |
| 4,890,303 A | 12/1989 | Bader ......................... 375/107 |
| 4,890,316 A | 12/1989 | Walsh et al. ................. 379/98 |
| 4,894,847 A | 1/1990 | Tjahjadi et al. ............. 375/121 |
| 4,901,333 A | 2/1990 | Hodgkiss ..................... 375/98 |
| 4,943,980 A | 7/1990 | Dobson et al. ............... 375/42 |
| 4,953,210 A | 8/1990 | McGlynn et al. ............. 380/48 |
| 4,967,413 A | 10/1990 | Otani ........................ 371/37.4 |
| 4,972,360 A | 11/1990 | Cuckier et al. ........ 364/724.04 |
| 4,985,902 A | 1/1991 | Gurcan ....................... 375/14 |
| 4,991,169 A | 2/1991 | Davis et al. .................. 370/77 |
| 4,995,030 A | 2/1991 | Helf .......................... 370/32.1 |
| 5,005,144 A | 4/1991 | Nakajima et al. ........... 364/565 |
| 5,007,047 A | 4/1991 | Sridhar et al. ............. 370/32.1 |
| 5,014,299 A | 5/1991 | Klupt et al. .................. 379/98 |
| 5,033,062 A | 7/1991 | Morrow et al. ................. 375/7 |
| 5,038,365 A | 8/1991 | Belloc et al. .................. 375/8 |
| 5,040,190 A | 8/1991 | Smith et al. ................... 375/4 |
| 5,052,000 A | 9/1991 | Wang et al. ................. 371/43 |
| 5,058,134 A | 10/1991 | Chevillat et al. ............. 375/39 |
| 5,065,410 A | 11/1991 | Yoshida et al. ............... 375/98 |
| 5,067,125 A | 11/1991 | Tsuchida ..................... 370/79 |
| 5,068,875 A | 11/1991 | Quintin ....................... 375/78 |
| 5,107,520 A | 4/1992 | Karam et al. ................. 375/60 |
| 5,111,481 A | 5/1992 | Chen et al. ................... 375/14 |
| 5,119,401 A | 6/1992 | Tsujimoto ..................... 375/14 |
| 5,119,403 A | 6/1992 | Krishnan ..................... 375/39 |
| 5,134,611 A | 7/1992 | Steinka et al. ................ 370/79 |
| 5,142,552 A | 8/1992 | Tzeng et al. .................. 375/14 |
| 5,157,690 A | 10/1992 | Buttle ......................... 375/14 |
| 5,187,732 A | 2/1993 | Suzuki ......................... 379/5 |
| 5,210,755 A | 5/1993 | Nagler et al. ............... 370/108 |
| 5,225,997 A | 7/1993 | Lederer et al. ............. 364/550 |
| 5,253,272 A | 10/1993 | Jaeger et al. ................. 375/60 |
| 5,253,291 A | 10/1993 | Naseer et al. ............... 379/406 |
| 5,265,151 A | 11/1993 | Goldstein .................... 379/97 |
| 5,285,474 A | 2/1994 | Chow et al. .................. 375/13 |
| 5,291,479 A | 3/1994 | Vaziri et al. ............... 370/58.2 |
| 5,311,578 A | 5/1994 | Bremer et al. ............... 379/97 |
| 5,317,594 A | 5/1994 | Goldstein ...................... 375/8 |
| 5,351,134 A | 9/1994 | Yaguchi et al. ............. 358/435 |
| 5,353,280 A | 10/1994 | Ungerböck ................ 370/32.1 |
| 5,386,438 A | 1/1995 | England ..................... 375/121 |
| 5,394,110 A | 2/1995 | Mizoguchi .................. 329/304 |
| 5,394,437 A | 2/1995 | Ayanoglu et al. ........... 375/222 |
| 5,398,303 A | 3/1995 | Tanaka ....................... 395/51 |
| 5,402,445 A | 3/1995 | Matsuura ................... 375/229 |
| 5,406,583 A | 4/1995 | Dagdeviren ................... 375/5 |
| 5,418,842 A | 5/1995 | Cooper ....................... 379/98 |
| 5,432,794 A | 7/1995 | Yaguchi ..................... 371/5.5 |
| 5,434,884 A | 7/1995 | Rushing et al. ............. 375/235 |
| 5,475,711 A | 12/1995 | Betts et al. ................. 375/240 |
| 5,491,720 A | 2/1996 | Davis et al. ................. 375/222 |
| 5,513,216 A | 4/1996 | Gadot et al. ................ 375/233 |
| 5,519,703 A | 5/1996 | Chauffour et al. ............. 370/84 |
| 5,528,625 A | 6/1996 | Ayanoglu et al. ........... 375/222 |
| 5,528,679 A | 6/1996 | Taarud ....................... 379/34 |
| 5,533,048 A | 7/1996 | Dolan ........................ 375/222 |
| 5,534,913 A | 7/1996 | Majeti et al. .................. 348/7 |
| 5,546,395 A | 8/1996 | Sharma et al. ................ 370/84 |
| 5,563,908 A | 10/1996 | Kaku et al. ................. 375/222 |
| 5,566,211 A | 10/1996 | Choi .......................... 375/332 |
| 5,598,401 A | 1/1997 | Blackwell et al. ............. 379/94 |
| 5,625,643 A | 4/1997 | Kaku et al. ................. 375/222 |
| 5,634,022 A | 5/1997 | Crouse et al. ............... 395/704 |
| 5,640,387 A | 6/1997 | Takahashi et al. ........... 370/359 |
| 5,646,958 A | 7/1997 | Tsujimoto ................... 375/233 |
| 5,671,250 A | 9/1997 | Bremer et al. .............. 375/222 |
| 5,694,420 A | 12/1997 | Ohki et al. .................. 375/222 |
| 5,710,792 A | 1/1998 | Fukawa et al. ............. 375/229 |
| 5,724,393 A | 3/1998 | Dagdeviren ................. 375/296 |
| 5,726,765 A | 3/1998 | Yoshida et al. ............. 358/412 |
| 5,729,226 A | 3/1998 | Betts et al. ................... 341/94 |
| 5,732,104 A | 3/1998 | Brown et al. ............... 375/222 |
| 5,734,663 A | 3/1998 | Eggenberger .............. 371/39.1 |
| 5,751,717 A | 5/1998 | Babu et al. ................. 370/466 |
| 5,751,796 A | 5/1998 | Scott et al. .............. 379/93.31 |
| 5,754,594 A | 5/1998 | Betts et al. ................. 375/285 |
| 5,757,849 A | 5/1998 | Gelblum et al. ............ 375/222 |
| 5,757,865 A | 5/1998 | Kaku et al. ................. 375/344 |
| 5,761,247 A | 6/1998 | Betts et al. ................. 375/316 |
| 5,768,311 A | 6/1998 | Betts et al. ................. 375/222 |
| 5,778,024 A | 7/1998 | McDonough ............... 375/216 |
| 5,784,377 A | 7/1998 | Baydar et al. .............. 370/463 |
| 5,784,405 A | 7/1998 | Betts et al. ................. 375/222 |
| 5,784,415 A | 7/1998 | Chevillat et al. ........... 375/341 |
| 5,793,809 A | 8/1998 | Holmquist .................. 375/242 |
| 5,796,808 A | 8/1998 | Scott et al. .............. 379/93.31 |
| 5,801,695 A | 9/1998 | Townshend ................. 375/340 |
| 5,805,669 A | 9/1998 | Bingel et al. ................. 379/28 |
| 5,809,075 A | 9/1998 | Townshend ................. 375/254 |
| 5,812,537 A | 9/1998 | Betts et al. ................. 370/286 |
| 5,815,534 A | 9/1998 | Glass ........................ 375/326 |
| 5,822,371 A | 10/1998 | Goldstein et al. ........... 375/242 |
| 5,825,816 A | 10/1998 | Cole et al. .................. 375/222 |
| 5,825,823 A | 10/1998 | Goldstein et al. ........... 375/286 |
| 5,831,561 A | 11/1998 | Cai et al. .................... 341/106 |
| 5,835,532 A | 11/1998 | Strolle et al. ............... 375/233 |
| 5,835,538 A | 11/1998 | Townshend ................. 375/295 |
| 5,838,724 A | 11/1998 | Cole et al. .................. 375/222 |
| 5,839,053 A | 11/1998 | Bosch et al. ............... 455/13.1 |
| 5,844,940 A | 12/1998 | Goodson et al. ............ 375/222 |
| 5,850,388 A | 12/1998 | Anderson et al. ............ 370/252 |
| 5,850,421 A | 12/1998 | Misra et al. ................. 375/354 |
| 5,852,631 A | 12/1998 | Scott .......................... 375/222 |
| 5,862,141 A | 1/1999 | Trotter ....................... 370/468 |
| 5,862,179 A | 1/1999 | Goldstein et al. ........... 375/242 |
| 5,862,184 A | 1/1999 | Goldstein et al. ........... 375/295 |
| 5,870,429 A | 2/1999 | Moran, III et al. .......... 375/222 |
| 5,872,817 A | 2/1999 | Wei ............................ 375/341 |
| 5,881,066 A | 3/1999 | Lepitre ..................... 371/20.5 |
| 5,881,102 A | 3/1999 | Samson ...................... 375/222 |
| 5,887,027 A | 3/1999 | Cohen et al. ............... 375/222 |
| 5,911,115 A | 6/1999 | Nair et al. .................... 455/63 |
| 5,914,982 A | 6/1999 | Bjarnason et al. .......... 375/222 |
| 5,918,204 A | 6/1999 | Tsurumaru .................. 704/214 |
| 5,926,506 A | 7/1999 | Berthold et al. ............ 375/222 |
| 6,639,939 B1 * | 10/2003 | Naden et al. ............... 375/140 |

OTHER PUBLICATIONS

Gardner, Interpolation in Digital Modems—Part I: Fundamentals, *IEEE Transactions on Communications,* vol. 41, No. 3, pp. 501–507 (Mar. 1993).

Humblet et al., The Information Driveway, *IEEE Communications Magazine*, pp. 64–68 (Dec. 1996).

Kalet et al., The Capacity of PCM Voiceband Channels, *IEEE International Conference on Communications '93*, pp. 507–511 (Geneva, Switzerland, May 23–26, 1993).

Mueller et al., Timing Recovery in Digital Synchronous Data Receiver, *IEEE Transactions on Communications*, vol. Com–24, No. 5, pp. 516–531 (May 1976).

Okubo et al., Building Block Design of Large Capacity PCM–TDMA Subscriber System and Direct Digital Interface to Digital Exchange, Japan Radio Co., Ltd., pp. 69–73 (Japan).

Pahlavan et al., Nonlinear Quantization and the Design of Coded and Uncoded Signal Constellations, *IEEE Transactions on Communications*, vol. 39, No. 8, pp. 1207–1215 (Aug. 1991).

Proakis, Digital Signaling Over a Channel with Intersymbol Interference, *Digital Communications*, pp. 373, 381 (McGraw–Hill Book Company, 1983).

Williams et al., Counteracting the Quantisation Noise from PCM Codecs, BT Laboratories, pp. 24–29 (UK).

A Digital Modem and Analogue Modem Pair for Use on the Public Switched Telephone Network (PSTN) at Data Signalling Rates of Up to 56 000 Bit/s Downstream and 33 600 Bit/s Upstream, *ITU–T V.90* (Sep. 1998).

Series V: Data Communication Over the Telephone Network; Interfaces and voiceband modems; A modem operating at data signalling rates of up to 33 600 bit/s for use on the general switched telephone network and on leased point–to–point 2–wire telephone type circuits, *ITU–T V.34* (10/96).

Bell, R.A., et al., Automatic Speed Reduction and Switched Network Back–up, *IBM Technical Disclosure Bulletin*, vol. 32, No. 1, pp. 154–157 (Jun. 1989).

Abbiate, J.C., et al., Variable–Data Transmission Modem, *IBM Technical Disclosure Bulletin*, vol. 17, No. 11, pp. 3301–3302 (Apr. 1975).

Data Communication Over the Telephone Network; Procedures for Starting Sessions of Data Transmissions Over the General Switched Telephone Network, *ITU–T V.8* (09/94).

Line Quality Monitoring Method, *IBM Technical Disclosure Bulletin*, vol. 18, No. 8, pp. 2726–2726 (Jan. 1976).

Loopback Tests for V.54 Data Communication Equipment, *IBM Technical Disclosure Bulletin*, vol. 32, No. 3A, pp. 295–299 (Aug. 1989).

On–Line Real Time Modem Testing, *IBM Technical Disclosure Bulletin*, vol. 20, No. 6, pp. 2252–2254 (Nov. 1977).

Pierobon, Gianfranco L., Codes of Zero Spectral Density at Zero Frequency, *IEEE Transactions on Information Theory*, vol. IT–30, No. 2, pp. 435–439 (Mar., 1984).

Marcus, Brian H, et al., On Codes with Spectral Nulls at Rational Submultiples of the Symbol Frequency, *IEEE Transactions on Information Theory*, vol. IT–33, No. 4, pp. 557–568 (Jul. 1987).

Fischer, Robert, et al., Signal Mapping for PCM Modems, *ITU–Telecommunications Standardization Sector PCM '97–120, V.pcm Rapporteur Meeting*, (Sunriver, Oregon; Sep. 4–12, 1997).

Pulse Code Modulation (PCM) of Voice Frequencies, *ITU–T*, Recommendation G.711 (Geneva, 1972).

Series G: Digital Transmission Systems; Terminal equipments—Coding of analogue signals by pulse code modulation; Pulse code modulation (PCM) of voice frequencies, *ITU–T*, Recommendation G.711 (Geneva, 1996).

Data Communication Over the Telephone Network; Error–Correcting Procedures for DCEs Using Asynchronous–to–Synchronous Conversion, *ITU–T V.42* (03/93).

Improvement to Spectral Shaping Technique, *Research Disclosure*, V. 41, n415111, pp. 1550–1551 (Nov. 1998).

TIA Standard Draft: North American Telephone Network Transmission Model for Evaluating Analog Client to Digitally Connected Server Modems, Telecommunications Industry Association PN3857, Draft 10 (Feb. 1999).

Davis, Gordon T., DSP and MATLAB implementation of model–based constellation generation (Sep. 18, 1998), Simulation for new constellation generation.

Woodruff, K.R, et al., Automatic and Adaptive System and Efficient Communication in Noisy Communication Line Environments, *IBM Technical Disclosure Bulletin*, vol. 24, No. 9, pp. 4627–2629 (Feb. 1982).

Godard, D., et al., Decision Feedback Equalizer Stabilization Adaptive Mode, *IBM Technical Disclosure Bulletin*, vol. 24, No. 11A, pp. 5691–5692 (Apr. 1982).

Borgnis–Desbordes, P., et al., Variable–Speed Data Transmission, *IBM Technical Disclosure Bulletin*, vol. 27, No. 4A, pp. 2269–2270 (Sep. 1984).

Couland, G., et al., Analog Wrap Self–Test in Modems During Retrain Operations, *IBM Technical Disclosure Bulletin*, vol. 28, No. 6, p. 2457 (Nov. 1985).

Maddens, F., Sixteen–State Forward Convolutional Encoder, *IBM Technical Disclosure Bulletin*, vol. 28, No. 6, pp. 2466–2468 (Nov. 1985).

Remote Modem–Type Self–Learning, *IBM Technical Disclosure Bulletin*, vol. 28, No. 6, pp. 2398–2399 (Nov. 1985).

Maddens, F., Sixteen–State Feedback Convolutional Encoder, *IBM Technical Disclosure Bulletin*, vol. 28, No. 10, pp. 4212–4213 (Mar. 1986).

Bell, R. A., et al., Automatic Speed Reduction and Switched Network Back–up, *IBM Technical Disclosure Bulletin*, vol. 32, No. 1, pp. 154–157 (Jun. 1989).

Nobakht, R.A., Trellis–Coded Modulation Coding Scheme for a 19/2 Kbps Modem, *IBM Technical Disclosure Bulletin*, vol. 36, No. 11, pp. 167–170 (Nov. 1993).

Nobakht, R.A., Unified Table Based Subset Decoder for the Viterbi Algorithm, *IBM Technical Disclosure Bulletin*, vol. 37, No. 09, pp. 581–587 (Sep. 1994).

Nobakht, R.A., Trellis Subset Decoder Algorithm Based on a Pattern Recognition Scheme, *IBM Technical Disclosure Bulletin*, vol. 37, No. 10, pp. 693–697 (Oct. 1994).

Abbiate, J.C., et al, Variable–Data Transmission Modem, *IBM Technical Disclosure Bulletin*, vol. 17, No. 11, pp. 3301–3302 (Apr. 1975).

Barlet, J., et al., Full Speed Recovery in High Speed Modems, *IBM Technical Disclosure Bulletin*, vol. 23, No. 2, pp. 641–643 (Jul. 1980).

Dialog Abstract, Sample rate converter for duplex modem, European Patent No. 285413.

Dialog Abstract, Two–speed full–duplex modem for telephone network, PCT No. WO 8501407.

Dialog Abstract, Digital data transmission system, European Patent No. 124674.

Dialog Abstract, Facsimile communication controller, Japanese Publication No. 04–175060 (Jun. 23, 1992).

Dialog Abstract, Picture communication equipment, Japanese Publication No. 03–120954 (May 23, 1991).

Dialog Abstract, Radio date transmission system, Japanese Publication No. 91–179535 (Jul. 17, 1989).

Dialog Abstract, Facsimile device, Japanese Publication No. 57–164654 (Oct. 9, 1982).

Dialog Abstract, Data repeater, Japanese Publication No. 57–087255 (May 31, 1982).

Dialog Abstract, Blinding training method for decision feedback equaliser having feed–forward and feedback filters, European Patent No. 880253.

Dialog Abstract, Processing method for distorted signal received by qam receiver, European Patent No. 465851.

Dialog Abstract, Establishing wireless communication channel, PCT No. WO 9905820.

Dialog Abstract, High–speed rate adaptive subscriber line digital data modem, PCT. No. WO 9830001.

Dialog Abstract, Digital modem in digital modulation system, Japanese Patent No. 8116341.

Dialog Abstract, Communication equipment and radio communication adapter, Japanese Publication No. 08–340289 (Dec. 24, 1996).

Dialog Abstract, Data recording method, Japanese Publication No. 05–089597 (Apr. 9, 1993).

Dialog Abstract, Transmission control system for data communication and its modem equipment, Japanese Publication No. 02–228853 (Sep. 11, 1990).

Naguib, A.F., et al., Dialog Abstract, A space–time coding modem for high–data–rate wireless communications, *IEEE Journal of Selected Areas in Communications*, vol. 16, No. 8, Abstract only–not pages.

Denno, S., et al., Dialog Abstract, Mbit/s burst modem with an adaptive equalizer for TDMA mobile radio communications, *IEICE Transactions on Communications*, vol. E81–B, No. 7, (Jul. 1998).

Naguib, A.F., et al., Dialog Abstract, A space–time coding modem for high–data–rate wireless communications, *GlobeCom 97, IEEE Global Telecommunications Conference*, vol. 1. (1997).

Kobayashi, K., et al., Dialog Abstract, Fully digital burst modem for satellite multimedia communication systems, *IEICE Transactions on Communications*, vol. E80–B, No. 1, (Jan. 1997).

Skellern, D.J., et al., Dialog Abstract, A high speed wireless LAN, *IEEE Micro*, vol. 17, No. 1, (Jan.–Feb. 1997).

Enomoto, K., et al., Dialog Abstract, A mode switching type burst demodulator AFC, *Transactions of the Institute of Electronics, Information and Communication Engineers*, vol. J76B–II, No. 5, (May 1993).

Betts, W., Dialog Abstract, Nonlinear encoding by surface projection, *International Conference on Data Transmission—Advances in Modem and ISDN Technology and Applications* (Sep. 23–25, 1992).

Schilling, D.L., et al., Dialog Abstract, The FAVR meteor burst communication experiment, *Military Communications in a Changing World MILCOM '91* (Nov. 4–7, 1991).

Jacobsmeyer, J.M., Dialog Abstract, Adaptive trellis–coded modulation for bandlimited meteor burst channels, *IEEE Journal on Selected Areas in Communications*, vol. 10, No. 3, (April 1992).

Sato, T., et al., Dialog Abstract, Protocol configuration and verification of an adaptive error control scheme over analog cellular networks, *IEEE Transactions on Vehicular Technology*, vol. 41, No. 1, (Feb. 1992).

Lee, L.–N., et al., Dialog Abstract, Digital signal processor––based programmable BPSK/QPSK/offset–QPSK modems, *COMSAT Technical Review*, (Fall 1989).

Sato, T., et al., Dialog Abstract, Error–free high–speed data modem,, *Oki Technical Review*, vol. 56, No. 133, (Apr. 1989).

Seo, J.–S., Dialog Astract, Performance of convolutional coded SQAM in hardlimited satellite channels, *IEEE International Conference on Communications BostonICC/89*, vol. 2, (Jun. 11–14, 1989).

Murakama, K., et al., Dialog Abstract, FEC combined burst–modem for business satellite communications use, *IEEE/IECE Global Telecommunications Conference 1987*, vol. 1, (Japan, Nov. 15–18, 1987).

McVerry, F., Dialog Abstract, Performance of a fast carrier recovery scheme for burst–format DQPSK transmission over satellite channels, *International Conference on Digital Processing of Signals in Communications*, (United Kingdom, 1985).

Filter, J.H.J., Dialog Abstract, An algorithm for detecting loss of synchronisation in data transmission test sets (modems), *Transactions of the South African Institute of Electrical Engineers*, vol. 76, No. 1, (Jan. 1985).

Gersho, A., Dialog Abstract, Reduced complexity implementation of passband adaptive equilizers, *IEEE Journal on Selected Areas in Communications*, vol. SAC–2, No. 5, (Sep. 1984).

Dialog Abstract, High–speed full–duplex modem reduces telephone connect time, *EDN*, vol. 27, No. 18, (Sep. 15, 1982).

Chadwick, H., et al., *Dialog Abstract, Performance of a TDMA burst modem through a dual nonlinear satellite channel, Fifth International Conference on Digital Satellite Communications*, (Italy, Mar. 23–26, 1981).

Nussbaumer, H., Dialog Abstract, Reducing the acquisition time in an automatic equalizer, *IBM Technical Disclosure Bulletin*, vol. 18, No. 5, (Oct. 1975).

Uzunoglu, V., et al., Dialog Abstract, Synchronous and the coherent phase–locked synchronous oscillators: new techniques in synchronization and tracking, *IEEE Transactions on Circuits and Systems*, vol. 36, No. 7, (Jul. 1989).

Minei, I., et al., Dialog Abstract, High–speed Internet access through unidirectional geostationary satellite channels, *IEEE Journal on Selected Areas in Communications*, vol. 17, No. 2, (Feb. 1999).

Ovadia, S., Dialog Abstract, The effect of interleaver depth and QAM channel frequency offset on the performance of multichannel AM–VSB/256–QAM video lightwave transmission systems, *International Conference on Telecommunications: Bridging East and West Communications*, vol. 1, (Greece, Jun. 21–25, 1998).

Johnson, R.W., et al., Dialog Abstract, Error correction coding for serial–tone HG transmission, *Seventh International Conference on HF Radio Systems and Techniques*, (United Kingdom, Jul. 7–10, 1997).

Karasawa, Y., et al., Dialog Abstract, Cycle slip in clock recovery on frequency–selected fading channels, *IEEE Transactions on Communications*, vol. 45, No. 3, (Mar. 1997).

Umehira, M., et al., Dialog Abstract, Design and performance of burst carrier recovery using a phase compensated filter, *Transactions of the Institute of Electronics, Information and Communication Engineers*, vol. J78B–II, No. 12, (Dec. 1995).

De Bot, P., et al., Dialog Abstract, An example of a multi-resolution digital terrestrial TV modem, *Proceedings of ICC '93—IEEE International Conference on Communications,* vol. 3, (Switzerland, May 23–26, 1993).

Lei, Chen, et al., Dialog Abstract, Single–tone HF high speed data modem, *Proceedings of TENCON '93—IEEE Region 10 International Conference on Computers, Communications and Automation,* vol. 3, (China, Oct. 19–21, 1993).

Woerner, B.D., et al., Dialog Abstract, Simulation issues for future wireless modems, *IEEE Communications,* vol. 32, No. 7, (Jul. 1994).

Sato, T., et al., Dialog Abstract, Vehicle terminal equipment with dedicated DSP, *Oki Technical Review,* vol. 58, No. 144, (Jul. 1992).

Sato, T., et al., Dialog Abstract, Protocol configuration and verification of an adaptive error control scheme over analog cellular networks, *IEEE Transactions on Vehicular Technology,* vol. 41, No. 1, (Feb. 1992).

Tamm, Yu.A., Dialog Abstract, The effect of suppressing harmonic interference using an adaptive equalizer, *Elektrosvyaz,* vol. 45, No. 3, (Mar. 1990).

Saleh, A.A.M., et al. Dialog Abstract, An experimental TDMA indoor radio communications systemusing slow frequency hopping and coding, *IEEE Transactions on Communications,* vol. 39, No. 1, (Jan., 1991).

Nergis, A., Dialog Abstract, Optimum HF digital communication systems with block coding and interleaving techniques, *Proceedings of the 1990 Bilkent International Conference on New Trends in Communication, Control and Signal Processing,* vol. 1, (Turkey, Jul. 2–5, 1990).

Kawamata, F., et al., Dialog Abstract, An evaluation of voice codes and facsimiles, *Review of the Communications Research Laboratory,* vol. 36, (Mar. 1990).

Sato, T., et al., Dialog Abstract, *Error–free high–speed data transmission protocol simultaneously applicable to both wire and mobile radio channels, 38th IEEE Vehicular Technology Conference: 'Telecommunications Freedom—Technology on the Move',* (Jun. 15–17, 1988).

Dialog Abstract, 1200–bit/s cellular modem DLD03H, *Oki Technical Review,* vol. 53, No. 127, (Jul. 1987).

Chamberlin, J.W., et al., Dialog Abstract, Design and field test of a 256–QAM DIV modem, *IEEE Journal on Selected Areas in Communications,* vol. SAC–5, No. 3, (Apr. 1987).

De Cristofaro, R., et al., Dialog Abstract, A 120 Bv/s QPSK modem designed for the IntelSAT TDMA network, *International Journal of Satellite Communications,* vol. 3, Nos. 1–2, (Jan.–Jun., 1985).

Shumate, A., Dialog Abstract, Error correction coding for channels subject to occasional losses of bit count integrity, *Military Communications Conference,* vol. 1, (Oct. 21–24, 1984).

Suyderhoud, H., et al., Dialog Abstract, Investigation of 9.6 kb/s data transmission via a PCM link at 64 kb/s with and without link errors, *International Journal of Satellite Communications,* vol. 2, No. 1, (Jan.–Mar. 1984).

Smith, C., Dialog Abstract, Relating the performance of speech processors to the bit error rate, *Speech Technology,* vol. 2, No. 1, (Sep.–Oct. 1983).

Suyderhoud, H., et al., Dialog Abstract, Investigation of 9.6–kbit/s data transmission via a PCM link at 64 kbit/s with and without link errors, *Sixth International Conference on Digital Satelite Communications Proceedings,* (Sep. 19–23, 1983).

Kittel, L., Dialog Abstract, Analogue and discrete channel models for signal transmission in mobile radio, *Frequenz,,* vol. 36, Nos. 4–5, (Apr.–May 1982).

Farrell, P.G., et al., Dialog Abstract, Soft–decision error control of h.f. data transmission, *IEE Proceedings F (Communications, Radar and Signal Processing),* vol. 127, No. 5, (Oct. 1980).

Johnson, A.L., Dialog Abstract, Simulation and Implementation of a modulation system for overcoming ionospheric scintillation fading, *AGARD Conference Proceedings No. 173 on Radio Systems and the Ionosphere,* (Greece, May 26–30, 1975).

Matsumura, K., et al., Dialog Abstract, Anti–interference data–transmission set of HF radio equipment, *Mitisubishi Electric Engineer,* No. 41 (Sep., 1974).

Blank, H.A., et al., Dialog Abstract, A Markov error channel model, *1973 National Telecommunications Conference,* vol. 1, (Nov. 26–28, 1973).

McGruther, W.G., Dialog Astract, Long term error performance data for operation at 2400 bps ona nonswitched private line network, *Summaries of papers presented at 1970 Canadian symposium on communications,* (Canada, Nov. 12–13, 1970).

Burton, H.O., et al., Dialog Abstract, On the use of error statistics from data transmission on telephone facilities to estimate performance of forward–error–correction, *1970 international conference on communications,* (Jun. 8–10, 1970).

Bowen, R.R., Dialog Abstract, Application on burst error correction codes data modems for dispersive channels, *Proceedings of the 1970 international symposium on information theory,* p. 1 (Netherlands, Jun. 15–19, 1970).

Pierce, A.W., et al., Dialog Abstract, Effective application of forward–acting error–control coding to multichannel h.f. data modems, *IEEE Transactions on Communication Technology,* vol. Com–18, No. 4, (Aug. 1970).

West, R.L., Abstract, Data Concentration Method, *IBM Technical Disclosure Bulletin,* http://w3.infogate.ibm.com:1207/SESS506884/GETDOC/39/2/1 (Jul., 1975).

Haas, L.C., et al., Abstract, Received Line Signal Quality Analysis, *IBM Technical Disclosure Bulletin,* http://w3.infogate.ibm.com;1207/SESS506884/GETDOC/43/1/1 (May, 1981).

Nussbaumer, H., Abstract, Reducing the Acquisition Time in an Automatic Equalizer, *IBM Technical Disclosure Bulletin,* http://w3.infogate.ibm.com:1207/SESS506884/GETDOC/40//2/1 (Oct. 1975).

Dialog Abstract, Listener echo canceller for digital communication system, PCT No. WO 9310607.

Dialog Abstract, Reduced time remote access method for modem computer, PCT No. WO 9209165.

* cited by examiner

SYSTEMS, METHODS AND COMPUTER PROGRAM PRODUCTS FOR FILTERING GLITCHES FROM MEASURED VALUES IN A SEQUENCE OF CODE POINTS

FIELD OF THE INVENTION

The present invention relates generally to the field of digital communications, and, more particularly, to the selection of code points for digital transmission of information.

BACKGROUND OF THE INVENTION

The demand for remote access to information sources and data retrieval, as evidenced by the success of services such as the World Wide Web, is a driving force for high-speed network access technologies. The public switched telephone network (PSTN) offers standard voice services over a 4 kHz bandwidth. Traditional analog modem standards generally assume that both ends of a modem communication session have an analog connection to the PSTN. Because data signals are typically converted from digital to analog when transmitted towards the PSTN and then from analog to digital when received from the PSTN, data rates may be limited to 33.6 kbps as defined in the V.34 Transmission Recommendation developed by the International Telecommunications Union (ITU).

The need for an analog modem may be eliminated, however, by using the basic rate interface (BRI) of the Integrated Services Digital Network (ISDN). A BRI offers end-to-end digital connectivity at an aggregate data rate of 160 kbps, which is comprised of two 64 kbps B channels, a 16 kbps D channel, and a separate maintenance channel. ISDN offers comfortable data rates for Internet access, telecommuting, remote education services, and some forms of video conferencing. ISDN deployment, however, has generally been very slow due to the substantial investment required of network providers for new equipment. Because the ISDN is not very pervasive in the PSTN, the network providers have typically tariffed ISDN services at relatively high rates, which may be ultimately passed on to the ISDN subscribers. In addition to the high service costs, subscribers must generally purchase or lease network termination equipment to access the ISDN.

While most subscribers do not enjoy end-to-end digital connectivity through the PSTN, the PSTN is nevertheless mostly digital. Typically, the only analog portion of the PSTN is the phone line or local loop that connects a subscriber or client modem (e.g., an individual subscriber in a home, office, or hotel) to the telephone company's central office (CO). Local telephone companies have been replacing portions of their original analog networks with digital switching equipment. Nevertheless, the connection between the home and the CO has been the slowest to change to digital as discussed in the foregoing with respect to ISDN BRI service. A recent data transmission recommendation issued by the ITU, known as V.90, takes advantage of the digital conversions that have been made in the PSTN. By viewing the PSTN as a digital network, V.90 technology can accelerate data downstream from the Internet or other information source to a subscriber's computer at data rates of up to 56 kbps, even when the subscriber is connected to the PSTN via an analog local loop.

To understand how the V.90 Recommendation achieves this higher data rate, it may be helpful to briefly review the operation of V.34 analog modems. V.34 modems are generally optimized for a configuration in which both ends of a communication session are connected to the PSTN by analog lines. Even though most of the PSTN is digital, V.34 modems treat the network as if it were entirely analog. Moreover, the V.34 Recommendation assumes that both ends of the communication session suffer impairment due to quantization noise introduced by analog-to-digital converters. That is, the analog signals transmitted from the V.34 modems are sampled at 8000 times per second by a codec upon reaching the PSTN with each sample being represented or quantized by an eight-bit pulse code modulation (PCM) codeword. The codec uses 256, non-uniformly spaced, PCM quantization levels defined according to either the $\mu$-law or A-law companding standard (i.e., the ITU G.711 Recommendation).

Because the analog waveforms are continuous and the binary PCM codewords are discrete, the digits that are sent across the PSTN can only approximate the original analog waveform. The difference between the original analog waveform and the reconstructed quantized waveform is called quantization noise, which limits the modem data rate.

While quantization noise may limit a V.34 communication session to 33.6 kbps, it nevertheless affects only analog-to-digital conversions. The V.90 standard relies on the lack of analog-to-digital conversions in the downstream path, outside of the conversion made at the subscriber's modem to enable transmission at 56 kbps.

The general environment for which the V.90 standard has been developed is depicted in FIG. 1. An Internet Service Provider (ISP) 22 is connected to a subscriber's computer 24 via a V.90 digital server modem 26, through the PSTN 28 via digital trunks (e.g., T1, E1, or ISDN Primary Rate Interface (PRI) connections), through a central office switch 32, and finally through an analog loop to the client's modem 34. The central office switch 32 is drawn outside of the PSTN 28 to better illustrate the connection of the subscriber's computer 24 and modem 34 into the PSTN 28. It should be understood that the central office 32 is, in fact, a part of the PSTN 28. The operation of a communication session between the subscriber 24 and an ISP 22 is best described with reference to the more detailed block diagram of FIG. 2.

Transmission from the server modem 26 to the client modem 34 will be described first. The information to be transmitted is first encoded using only the 256 PCM codewords used by the digital switching and transmission equipment in the PSTN 28. These PCM codewords are transmitted towards the PSTN by the PCM transmitter 36 where they are received by a network codec. The PCM data is then transmitted through the PSTN 28 until reaching the central office 32 to which the client modem 34 is connected. Before transmitting the PCM data to the client modem 34, the data is converted from its current form as either $\mu$-law or A-law companded PCM codewords to pulse amplitude modulated PAM voltages by the codec expander (digital-to-analog (D/A) converter) 38. These PAM voltage levels are processed by a central office hybrid 42 where the unidirectional signal received from the codec expander 38 is transmitted towards the client modem 34 as part of a bidirectional signal. A second hybrid 44 at the subscriber's analog telephone connection converts the bidirectional signal back into a pair of unidirectional signals. Finally, the analog signal from the hybrid 44 is converted into digital PAM samples by an analog-to-digital (A/D) converter 46, which are received and decoded by the PAM receiver 48. Note that for transmission to succeed effectively at 56 kbps, there must be only a single digital-to-analog conversion and subsequent analog-to-digital conversion between the server modem 26 and the client modem 34. Recall that analog-to-digital conversions in the PSTN 28 may introduce quantization noise, which may limit the data rate as discussed hereinbefore. The A/D converter 46 at the client modem 34, however, may have a higher resolution than the A/D converters used in the analog portion of the PSTN 28 (e.g., 16 bits versus 8 bits), which results in less quantization noise. Moreover, the PAM receiver 48 needs to be in synchronization with the 8 kHz network clock to properly decode the digital PAM samples.

Transmission from the client modem 34 to the server modem 26 follows the V.34 data transmission standard. That is, the client modem 34 includes a V.34 transmitter 52 and a D/A converter 54 that encode and modulate the digital data to be sent using techniques such as quadrature amplitude modulation (QAM). The hybrid 44 converts the unidirectional signal from the digital-to-analog converter 54 into a bidirectional signal that is transmitted to the central office 32. Once the signal is received at the central office 32, the central office hybrid 42 converts the bidirectional signal into a unidirectional signal that is provided to the central office codec. This unidirectional, analog signal is converted into either $\mu$-law or A-law companded PCM codewords by the codec compressor (A/D converter) 56, which are then transmitted through the PSTN 28 until reaching the server modem 26. The server modem 26 includes a conventional V.34 receiver 58 for demodulating and decoding the data sent by the V.34 transmitter 52 in the client modem 34. Thus, data is transferred from the client modem 34 to the server modem 26 at data rates of up to 33.6 kbps as provided for in the V.34 standard.

The V.90 standard offers increased data rates (e.g., data rates up to 56 kbps) in the downstream direction from a server to a subscriber or client. Upstream communication still takes place at conventional data rates as provided for in the V.34 standard. Nevertheless, this asymmetry may be particularly well suited for Internet access. For example, when accessing the Internet, high bandwidth is most useful when downloading large text, video, and audio files to a subscriber's computer. Using V.90, these data transfers can be made at up to 56 kbps. On the other hand, traffic flow from the subscriber to an ISP consists mainly of keystroke and mouse commands, which are readily handled by the conventional rates provided by V.34.

As described above, the digital portion of the PSTN 28 transmits information using eight-bit PCM codewords at a frequency of 8000 Hz. Thus, it would appear that downstream transmission should take place at 64 kbps rather than 56 kbps as defined by the V.90 standard. While 64 kbps is a theoretical maximum, several factors prevent actual transmission rates from reaching this ideal rate. First, even though the problem of quantization error has been substantially eliminated by using PCM encoding and PAM for transmission, additional noise in the network or at the subscriber premises, such as non-linear distortion and crosstalk, may limit the maximum data rate. Furthermore, the $\mu$-law or A-law companding techniques do not use uniform PAM voltage levels for defining the PCM codewords. The PCM codewords representing very low levels of sound have PAM voltage levels spaced close together. Noisy transmission facilities may prevent these PAM voltage levels from being distinguished from one another thereby causing loss of data. Accordingly, to provide greater separation between the PAM voltages used for transmission, not all of the 256 PCM codewords are used.

It is generally known that, assuming a convolutional coding scheme, such as trellis coding, is not used, the number of symbols required to transmit a certain data rate is given by Equation 1:

$$bps = R_s \log_2 N_s \qquad \text{EQ. 1}$$

where bps is the data rate in bits per second, $R_s$ is the symbol rate, and $N_s$ is the number of symbols in the signaling alphabet or constellation. To transmit at 56 kbps using a symbol rate of 8000, Equation 1 can be rewritten to solve for the number of symbols required as set forth below in Equation 2:

$$N_s = 2^{56000/8000} = 128 \qquad \text{EQ. 2}$$

Thus, the 128 most robust codewords of the 256 available PCM codewords are chosen for transmission as part of the V.90 standard.

The V.90 standard, therefore, provides a framework for transmitting data at rates up to 56 kbps provided the network is capable of supporting the higher rates. The most notable requirement is that there can be at most one digital-to-analog conversion and no analog-to-digital conversion in the downstream path in the network. Nevertheless, other digital impairments, such as robbed bit signaling (RBS) and digital mapping through PADS, which results in attenuated signals, may also inhibit transmission at V.90 rates. Communication channels exhibiting non-linear frequency response characteristics are yet another impediment to transmission at the V.90 rates. Moreover, these other factors may limit conventional V.90 performance to less than the 56 kbps theoretical data rate.

Because digital impairments, such as RBS and PAD, may vary from connection to connection and RBS mapping may be different for each of the 6 frame intervals, V.90 provides for learning the levels of the code points for the PCM codewords when a connection is established. For example, in Phase 3 of the V.90 standard, a sequence of PCM levels are defined by the client modem and then sent from the server modem to the client modem. The resulting levels as received by the client modem are used by the client modem to help determine the nature of the digital portion of the telephone connection and to select appropriate code points for signal constellations in each of the 6 frame intervals used to transfer data. Thus, for example, Table 1 illustrates "ideal" levels for the U.S. network for 128 code points in 6 frame intervals.

TABLE 1

Ideal PCM Levels with no random noise distortions

| Ucode | Frame 1 m-law linear | Frame 2 m-law linear | Frame 3 m-law linear | Frame 4 m-law linear | Frame 5 m-law linear | Frame 6 m-law linear |
| --- | --- | --- | --- | --- | --- | --- |
| 0 | 0 | 0 | 0 | 0 | 0 | 0 |
| 1 | 8 | 8 | 8 | 8 | 8 | 8 |
| 2 | 16 | 16 | 16 | 16 | 16 | 16 |
| 3 | 24 | 24 | 24 | 24 | 24 | 24 |
| 4 | 32 | 32 | 32 | 32 | 32 | 32 |
| 5 | 40 | 40 | 40 | 40 | 40 | 40 |
| 6 | 48 | 48 | 48 | 48 | 48 | 48 |
| 7 | 56 | 56 | 56 | 56 | 56 | 56 |
| 8 | 64 | 64 | 64 | 64 | 64 | 64 |
| 9 | 72 | 72 | 72 | 72 | 72 | 72 |
| 10 | 80 | 80 | 80 | 80 | 80 | 80 |
| 11 | 88 | 88 | 88 | 88 | 88 | 88 |
| 12 | 96 | 96 | 96 | 96 | 96 | 96 |
| 13 | 104 | 104 | 104 | 104 | 104 | 104 |
| 14 | 112 | 112 | 112 | 112 | 112 | 112 |
| 15 | 120 | 120 | 120 | 120 | 120 | 120 |
| 16 | 132 | 132 | 132 | 132 | 132 | 132 |
| 17 | 148 | 148 | 148 | 148 | 148 | 148 |
| 18 | 164 | 164 | 164 | 164 | 164 | 164 |
| 19 | 180 | 180 | 180 | 180 | 180 | 180 |

TABLE 1-continued

Ideal PCM Levels with no random noise distortions

| Ucode | Frame 1 m-law linear | Frame 2 m-law linear | Frame 3 m-law linear | Frame 4 m-law linear | Frame 5 m-law linear | Frame 6 m-law linear |
| --- | --- | --- | --- | --- | --- | --- |
| 20 | 196 | 196 | 196 | 196 | 196 | 196 |
| 21 | 212 | 212 | 212 | 212 | 212 | 212 |
| 22 | 228 | 228 | 228 | 228 | 228 | 228 |
| 23 | 244 | 244 | 244 | 244 | 244 | 244 |
| 24 | 260 | 260 | 260 | 260 | 260 | 260 |
| 25 | 276 | 276 | 276 | 276 | 276 | 276 |
| 26 | 292 | 292 | 292 | 292 | 292 | 292 |
| 27 | 308 | 308 | 308 | 308 | 308 | 308 |
| 28 | 324 | 324 | 324 | 324 | 324 | 324 |
| 29 | 340 | 340 | 340 | 340 | 340 | 340 |
| 30 | 356 | 356 | 356 | 356 | 356 | 356 |
| 31 | 372 | 372 | 372 | 372 | 372 | 372 |
| 32 | 396 | 396 | 396 | 396 | 396 | 396 |
| 33 | 428 | 428 | 428 | 428 | 428 | 428 |
| 34 | 460 | 460 | 460 | 460 | 460 | 460 |
| 35 | 492 | 492 | 492 | 492 | 492 | 492 |
| 36 | 524 | 524 | 524 | 524 | 524 | 524 |
| 37 | 556 | 556 | 556 | 556 | 556 | 556 |
| 38 | 588 | 588 | 588 | 588 | 588 | 588 |
| 39 | 620 | 620 | 620 | 620 | 620 | 620 |
| 40 | 652 | 652 | 652 | 652 | 652 | 652 |
| 41 | 684 | 684 | 684 | 684 | 684 | 684 |
| 42 | 716 | 716 | 716 | 716 | 716 | 716 |
| 43 | 748 | 748 | 748 | 748 | 748 | 748 |
| 44 | 780 | 780 | 780 | 780 | 780 | 780 |
| 45 | 812 | 812 | 812 | 812 | 812 | 812 |
| 46 | 844 | 844 | 844 | 844 | 844 | 844 |
| 47 | 876 | 876 | 876 | 876 | 876 | 876 |
| 48 | 924 | 924 | 924 | 924 | 924 | 924 |
| 49 | 988 | 988 | 988 | 988 | 988 | 988 |
| 50 | 1052 | 1052 | 1052 | 1052 | 1052 | 1052 |
| 51 | 1116 | 1116 | 1116 | 1116 | 1116 | 1116 |
| 52 | 1180 | 1180 | 1180 | 1180 | 1180 | 1180 |
| 53 | 1244 | 1244 | 1244 | 1244 | 1244 | 1244 |
| 54 | 1308 | 1308 | 1308 | 1308 | 1308 | 1308 |
| 55 | 1372 | 1372 | 1372 | 1372 | 1372 | 1372 |
| 56 | 1436 | 1436 | 1436 | 1436 | 1436 | 1436 |
| 57 | 1500 | 1500 | 1500 | 1500 | 1500 | 1500 |
| 58 | 1564 | 1564 | 1564 | 1564 | 1564 | 1564 |
| 59 | 1628 | 1628 | 1628 | 1628 | 1628 | 1628 |
| 60 | 1692 | 1692 | 1692 | 1692 | 1692 | 1692 |
| 61 | 1756 | 1756 | 1756 | 1756 | 1756 | 1756 |
| 62 | 1820 | 1820 | 1820 | 1820 | 1820 | 1820 |
| 63 | 1884 | 1884 | 1884 | 1884 | 1884 | 1884 |
| 64 | 1980 | 1980 | 1980 | 1980 | 1980 | 1980 |
| 65 | 2108 | 2108 | 2108 | 2108 | 2108 | 2108 |
| 66 | 2236 | 2236 | 2236 | 2236 | 2236 | 2236 |
| 67 | 2364 | 2364 | 2364 | 2364 | 2364 | 2364 |
| 68 | 2492 | 2492 | 2492 | 2492 | 2492 | 2492 |
| 69 | 2620 | 2620 | 2620 | 2620 | 2620 | 2620 |
| 70 | 2748 | 2748 | 2748 | 2748 | 2748 | 2748 |
| 71 | 2876 | 2876 | 2876 | 2876 | 2876 | 2876 |
| 72 | 3004 | 3004 | 3004 | 3004 | 3004 | 3004 |
| 73 | 3132 | 3132 | 3132 | 3132 | 3132 | 3132 |
| 74 | 3260 | 3260 | 3260 | 3260 | 3260 | 3260 |
| 75 | 3388 | 3388 | 3388 | 3388 | 3388 | 3388 |
| 76 | 3516 | 3516 | 3516 | 3516 | 3516 | 3516 |
| 77 | 3644 | 3644 | 3644 | 3644 | 3644 | 3644 |
| 78 | 3772 | 3772 | 3772 | 3772 | 3772 | 3772 |
| 79 | 3900 | 3900 | 3900 | 3900 | 3900 | 3900 |
| 80 | 4092 | 4092 | 4092 | 4092 | 4092 | 4092 |
| 81 | 4348 | 4348 | 4348 | 4348 | 4348 | 4348 |
| 82 | 4604 | 4604 | 4604 | 4604 | 4604 | 4604 |
| 83 | 4860 | 4860 | 4860 | 4860 | 4860 | 4860 |
| 84 | 5116 | 5116 | 5116 | 5116 | 5116 | 5116 |
| 85 | 5372 | 5372 | 5372 | 5372 | 5372 | 5372 |
| 86 | 5628 | 5628 | 5628 | 5628 | 5628 | 5628 |
| 87 | 5884 | 5884 | 5884 | 5884 | 5884 | 5884 |
| 88 | 6140 | 6140 | 6140 | 6140 | 6140 | 6140 |
| 89 | 6396 | 6396 | 6396 | 6396 | 6396 | 6396 |
| 90 | 6652 | 6652 | 6652 | 6652 | 6652 | 6652 |
| 91 | 6908 | 6908 | 6908 | 6908 | 6908 | 6908 |
| 92 | 7164 | 7164 | 7164 | 7164 | 7164 | 7164 |
| 93 | 7420 | 7420 | 7420 | 7420 | 7420 | 7420 |
| 94 | 7676 | 7676 | 7676 | 7676 | 7676 | 7676 |
| 95 | 7932 | 7932 | 7932 | 7932 | 7932 | 7932 |
| 96 | 8316 | 8316 | 8316 | 8316 | 8316 | 8316 |
| 97 | 8828 | 8828 | 8828 | 8828 | 8828 | 8828 |
| 98 | 9340 | 9340 | 9340 | 9340 | 9340 | 9340 |
| 99 | 9852 | 9852 | 9852 | 9852 | 9852 | 9852 |
| 100 | 10364 | 10364 | 10364 | 10364 | 10364 | 10364 |
| 101 | 10876 | 10876 | 10876 | 10876 | 10876 | 10876 |
| 102 | 11388 | 11388 | 11388 | 11388 | 11388 | 11388 |
| 103 | 11900 | 11900 | 11900 | 11900 | 11900 | 11900 |
| 104 | 12412 | 12412 | 12412 | 12412 | 12412 | 12412 |
| 105 | 12924 | 12924 | 12924 | 12924 | 12924 | 12924 |
| 106 | 13436 | 13436 | 13436 | 13436 | 13436 | 13436 |
| 107 | 13948 | 13948 | 13948 | 13948 | 13948 | 13948 |
| 108 | 14460 | 14460 | 14460 | 14460 | 14460 | 14460 |
| 109 | 14972 | 14972 | 14972 | 14972 | 14972 | 14972 |
| 110 | 15484 | 15484 | 15484 | 15484 | 15484 | 15484 |
| 111 | 15996 | 15996 | 15996 | 15996 | 15996 | 15996 |
| 112 | 16764 | 16764 | 16764 | 16764 | 16764 | 16764 |
| 113 | 17788 | 17788 | 17788 | 17788 | 17788 | 17788 |
| 114 | 18812 | 18812 | 18812 | 18812 | 18812 | 18812 |
| 115 | 19836 | 19836 | 19836 | 19836 | 19836 | 19836 |
| 116 | 20860 | 20860 | 20860 | 20860 | 20860 | 20860 |
| 117 | 21884 | 21884 | 21884 | 21884 | 21884 | 21884 |
| 118 | 22908 | 22908 | 22908 | 22908 | 22908 | 22908 |
| 119 | 23932 | 23932 | 23932 | 23932 | 23932 | 23932 |
| 120 | 24956 | 24956 | 24956 | 24956 | 24956 | 24956 |
| 121 | 25980 | 25980 | 25980 | 25980 | 25980 | 25980 |
| 122 | 27004 | 27004 | 27004 | 27004 | 27004 | 27004 |
| 123 | 28028 | 28028 | 28028 | 28028 | 28028 | 28028 |
| 124 | 29052 | 29052 | 29052 | 29052 | 29052 | 29052 |
| 125 | 30076 | 30076 | 30076 | 30076 | 30076 | 30076 |
| 126 | 31100 | 31100 | 31100 | 31100 | 31100 | 31100 |
| 127 | 32124 | 32124 | 32124 | 32124 | 32124 | 32124 |

During transmission and acquisition of these levels by the client modem, some levels may be corrupted by noise, non-linearities, and other impairments within the network. Large disturbances in the levels acquired by the client modem can significantly detract from the client modem capability to select appropriate code points for its signal constellations which may lead to sub-optimum connections and possibly failure to connect in some cases. Table 2 below is an example of measured levels for a 110 code point implementation with noise present in the 6 frame intervals.

TABLE 2

PCM Levels Altered due to Random Noise

| Ucode | Frame 1 m-law linear | Frame 2 m-law linear | Frame 3 m-law linear | Frame 4 m-law linear | Frame 5 m-law linear | Frame 6 m-law linear |
| --- | --- | --- | --- | --- | --- | --- |
| 0 | 22 | 23 | 24 | 23 | 24 | 22 |
| 1 | 20 | 22 | 18 | 29 | 20 | 22 |
| 2 | 27 | 23 | 24 | 22 | 24 | 19 |
| 3 | 34 | 24 | 32 | 33 | 24 | 25 |
| 4 | 32 | 25 | 31 | 41 | 29 | 33 |
| 5 | 46 | 42 | 36 | 43 | 28 | 27 |
| 6 | 42 | 52 | 46 | 48 | 48 | 43 |
| 7 | 56 | 58 | 52 | 58 | 43 | 48 |
| 8 | 60 | 60 | 64 | 69 | 66 | 59 |
| 9 | 71 | 77 | 70 | 66 | 64 | 62 |
| 10 | 80 | 82 | 79 | 78 | 78 | 80 |
| 11 | 87 | 88 | 83 | 83 | 78 | 81 |
| 12 | 94 | 101 | 92 | 86 | 97 | 99 |
| 13 | 104 | 108 | 103 | 100 | 96 | 94 |

TABLE 2-continued

PCM Levels Altered due to Random Noise

| Ucode | Frame 1 m-law linear | Frame 2 m-law linear | Frame 3 m-law linear | Frame 4 m-law linear | Frame 5 m-law linear | Frame 6 m-law linear |
|---|---|---|---|---|---|---|
| 14 | 111 | 116 | 112 | 106 | 110 | 111 |
| 15 | 122 | 123 | 116 | 111 | 110 | 115 |
| 16 | 132 | 131 | 129 | 132 | 129 | 134 |
| 17 | 145 | 148 | 148 | 144 | 131 | 136 |
| 18 | 159 | 158 | 163 | 163 | 163 | 165 |
| 19 | 184 | 174 | 178 | 181 | 162 | 164 |
| 20 | 191 | 190 | 197 | 193 | 194 | 200 |
| 21 | 209 | 210 | 212 | 213 | 197 | 198 |
| 22 | 228 | 222 | 224 | 231 | 230 | 234 |
| 23 | 248 | 243 | 241 | 244 | 230 | 229 |
| 24 | 257 | 252 | 263 | 259 | 257 | 269 |
| 25 | 273 | 270 | 277 | 279 | 259 | 262 |
| 26 | 294 | 291 | 291 | 295 | 294 | 291 |
| 27 | 302 | 299 | 312 | 312 | 292 | 294 |
| 28 | 323 | 319 | 323 | 330 | 324 | 320 |
| 29 | 341 | 340 | 338 | 343 | 323 | 318 |
| 30 | 356 | 356 | 353 | 351 | 355 | 358 |
| 31 | 372 | 371 | 369 | 377 | 359 | 354 |
| 32 | 393 | 398 | 396 | 388 | 400 | 395 |
| 33 | 431 | 428 | 431 | 420 | 394 | 395 |
| 34 | 461 | 459 | 464 | 455 | 458 | 464 |
| 35 | 496 | 492 | 493 | 487 | 460 | 462 |
| 36 | 526 | 526 | 530 | 518 | 522 | 525 |
| 37 | 555 | 551 | 562 | 554 | 522 | 525 |
| 38 | 589 | 585 | 587 | 580 | 591 | 591 |
| 39 | 622 | 615 | 620 | 617 | 587 | 588 |
| 40 | 656 | 652 | 655 | 648 | 657 | 652 |
| 41 | 685 | 677 | 690 | 686 | 655 | 653 |
| 42 | 720 | 715 | 717 | 711 | 717 | 714 |
| 43 | 748 | 744 | 753 | 743 | 717 | 716 |
| 44 | 781 | 774 | 784 | 780 | 785 | 780 |
| 45 | 817 | 805 | 821 | 810 | 778 | 778 |
| 46 | 844 | 843 | 849 | 837 | 845 | 844 |
| 47 | 876 | 873 | 878 | 874 | 848 | 840 |
| 48 | 924 | 922 | 925 | 920 | 926 | 920 |
| 49 | 986 | 990 | 985 | 986 | 926 | 918 |
| 50 | 1052 | 1052 | 1048 | 1043 | 1053 | 1055 |
| 51 | 1118 | 1117 | 1116 | 1114 | 1052 | 1048 |
| 52 | 1185 | 1179 | 1180 | 1172 | 1178 | 1176 |
| 53 | 1250 | 1242 | 1245 | 1233 | 1179 | 1179 |
| 54 | 1309 | 1306 | 1305 | 1297 | 1312 | 1307 |
| 55 | 1375 | 1376 | 1370 | 1360 | 1312 | 1306 |
| 56 | 1439 | 1428 | 1435 | 1429 | 1439 | 1434 |
| 57 | 1505 | 1498 | 1500 | 1490 | 1435 | 1436 |
| 58 | 1565 | 1562 | 1564 | 1551 | 1565 | 1565 |
| 59 | 1631 | 1622 | 1626 | 1619 | 1566 | 1565 |
| 60 | 1694 | 1685 | 1689 | 1683 | 1695 | 1691 |
| 61 | 1758 | 1748 | 1757 | 1742 | 1694 | 1695 |
| 62 | 1820 | 1809 | 1821 | 1815 | 1819 | 1812 |
| 63 | 1885 | 1878 | 1882 | 1874 | 1817 | 1809 |
| 64 | 1981 | 1966 | 1987 | 1975 | 1983 | 1971 |
| 65 | 2107 | 2094 | 2117 | 2097 | 1986 | 1973 |
| 66 | 2240 | 2226 | 2241 | 2226 | 2240 | 2224 |
| 67 | 2363 | 2341 | 2374 | 2360 | 2241 | 2224 |
| 68 | 2501 | 2474 | 2500 | 2483 | 2498 | 2479 |
| 69 | 2624 | 2606 | 2628 | 2613 | 2493 | 2479 |
| 70 | 2750 | 2735 | 2754 | 2736 | 2758 | 2736 |
| 71 | 2877 | 2856 | 2889 | 2872 | 2755 | 2734 |
| 72 | 3012 | 2991 | 3012 | 2994 | 3011 | 2987 |
| 73 | 3142 | 3117 | 3146 | 3119 | 3009 | 2990 |
| 74 | 3263 | 3244 | 3272 | 3245 | 3269 | 3242 |
| 75 | 3394 | 3371 | 3399 | 3378 | 3269 | 3245 |
| 76 | 3526 | 3501 | 3533 | 3498 | 3524 | 3503 |
| 77 | 3653 | 3628 | 3658 | 3626 | 3528 | 3498 |
| 78 | 3776 | 3759 | 3779 | 3757 | 3778 | 3752 |
| 79 | 3898 | 3887 | 3910 | 3881 | 3774 | 3757 |
| 80 | 4095 | 4072 | 4094 | 4080 | 4093 | 4080 |
| 81 | 4355 | 4340 | 4355 | 4336 | 4092 | 4077 |
| 82 | 4612 | 4595 | 4612 | 4595 | 4613 | 4592 |
| 83 | 4877 | 4849 | 4868 | 4859 | 4615 | 4593 |
| 84 | 5127 | 5108 | 5132 | 5114 | 5134 | 5107 |
| 85 | 5384 | 5367 | 5394 | 5374 | 5137 | 5101 |
| 86 | 5654 | 5622 | 5648 | 5629 | 5653 | 5623 |
| 87 | 5904 | 5879 | 5908 | 5893 | 5659 | 5624 |
| 88 | 6167 | 6137 | 6172 | 6143 | 6167 | 6138 |
| 89 | 6422 | 6402 | 6427 | 6402 | 6168 | 6134 |
| 90 | 6687 | 6655 | 6684 | 6659 | 6690 | 6655 |
| 91 | 6946 | 6922 | 6949 | 6922 | 6682 | 6650 |
| 92 | 7200 | 7182 | 7207 | 7168 | 7205 | 7167 |
| 93 | 7463 | 7431 | 7459 | 7433 | 7210 | 7165 |
| 94 | 7723 | 7689 | 7719 | 7691 | 7719 | 7687 |
| 95 | 7982 | 7939 | 7972 | 7951 | 7720 | 7685 |
| 96 | 8370 | 8336 | 8367 | 8326 | 8364 | 8328 |
| 97 | 8889 | 8859 | 8893 | 8854 | 8370 | 8323 |
| 98 | 9409 | 9377 | 9415 | 9364 | 9408 | 9366 |
| 99 | 9931 | 9893 | 9938 | 9881 | 9405 | 9366 |
| 100 | 10454 | 10414 | 10449 | 10404 | 10450 | 10398 |
| 101 | 10974 | 10929 | 10967 | 10923 | 10452 | 10397 |
| 102 | 11493 | 11448 | 11502 | 11431 | 11484 | 11435 |
| 103 | 12018 | 11959 | 12011 | 11956 | 11485 | 11437 |
| 104 | 12527 | 12483 | 12532 | 12469 | 12526 | 12463 |
| 105 | 13048 | 12999 | 13050 | 12990 | 12529 | 12466 |
| 106 | 13573 | 13517 | 13574 | 13494 | 13555 | 13509 |
| 107 | 14091 | 14024 | 14085 | 14028 | 13567 | 13499 |
| 108 | 14607 | 14540 | 14602 | 14543 | 14603 | 14528 |
| 109 | 15116 | 15066 | 15129 | 15046 | 14597 | 14523 |

As can be seen from Table 2, noise may result in erroneous levels being established. For example, in Frame 5 of Table 2, noise has resulted in code point 40 having a higher level than code point 41. Similarly, code points 42 and 43 have the same levels. When compared with the ideal values in Table 1, it can be seen that these values may be in error. These errors may, as described above, result in degraded performance of the modem through the selection of less than optimum code points.

SUMMARY OF THE INVENTION

In light of the above discussion, it is an object of the present invention to reduce the impact that noise spikes may have on the selection of code points for a modem.

It is another object of the present invention to reduce the impact of noise spikes even in the presence of digital impairments such as robbed bit signaling.

These and other objects, advantages, and features of the present invention may be provided by glitch filters, methods, and computer program products that utilize the generally monotonically increasing characteristics of the expected levels of code points to detect and remove noise spikes by replacing values in the code point sequence with new values based on the code points around a suspect value. Thus, the present invention may reduce the impact of noise spikes on the levels of the code point sequence and, thereby, improve the selection of a constellation of code points for data communications.

In particular embodiments of the present invention, noise is filtered from measured values associated with a sequence of code points by evaluating measured values associated with two code points in the sequence of code points which are immediately higher in the sequence of code points than a code point of interest so as to select a larger value of the two code points in the sequence as a first reference value. The first reference value is compared with a measured value associated with a code point in the sequence of code points immediately lower than the code point of interest to determine if the first reference value is smaller than the measured value associated with the code point in the sequence of code points immediately lower than the code point of interest. The smaller of the first reference value and the measured value associated with a code point in the sequence of code points immediately lower than the code point of interest is then selected so as to provide a first replacement value. The measured value associated with the code point of interest is then replaced with the first replacement value if the first reference value is smaller than the measured value associated with the code point of interest.

Through the use of two code points higher than the evaluated code point, the impact of robbed-bit signaling and other digital impairments may be taken into account such that these digital impairments are not detected as noise spikes and values replaced. Additionally, through the evaluation of measured values for a code point immediately below the code point being evaluated, the present invention may take into account the possibility of a noise spike affecting two consecutive code points.

In a further aspect of the present invention, the first reference value is compared with the measured value of the code point of interest so as to determine if the measured value of the code point of interest is less than the first reference value. If so, then the sequence is nearly monotonically increasing and no replacement of the measured level is needed. Therefore, a new code point of interest may be established as a code point of interest lower than the current code point of interest without replacing the measured value of the code point of interest if the measured value of the code point of interest is less than the first reference value. Preferably, the new code point of interest is a code point of the sequence of code points immediately lower than the code point of interest of the sequence of code points. Such operations may continue until a lowest code point of the sequence of code points is reached.

In a particular embodiment of the present invention, the sequence of code points comprises Pulse Code Modulation (PCM) code points of a modem. In such an embodiment, the sequence code points may be a plurality of sequences corresponding to a plurality of framing intervals. In such a case, it is preferred that the operations according to the present invention be carried out for each of the plurality of sequences.

As will be appreciated by those of skill in the art, the present invention may be embodied as methods, systems and/or computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENTS

Figure 1:
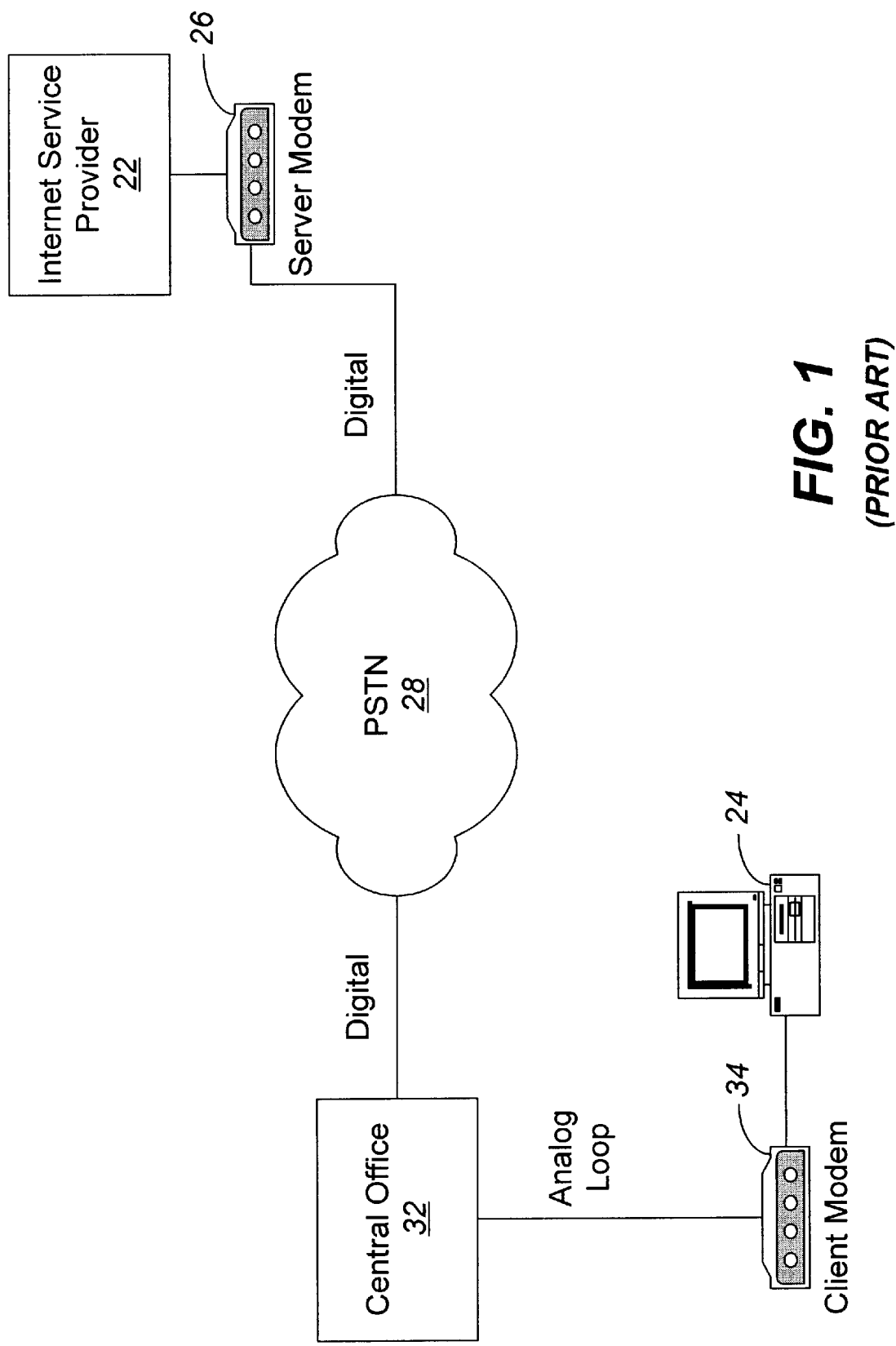
FIG. 1 is a block diagram that illustrates a typical V.90 connection between a subscriber and an ISP in accordance with the prior art.
Figure 2:
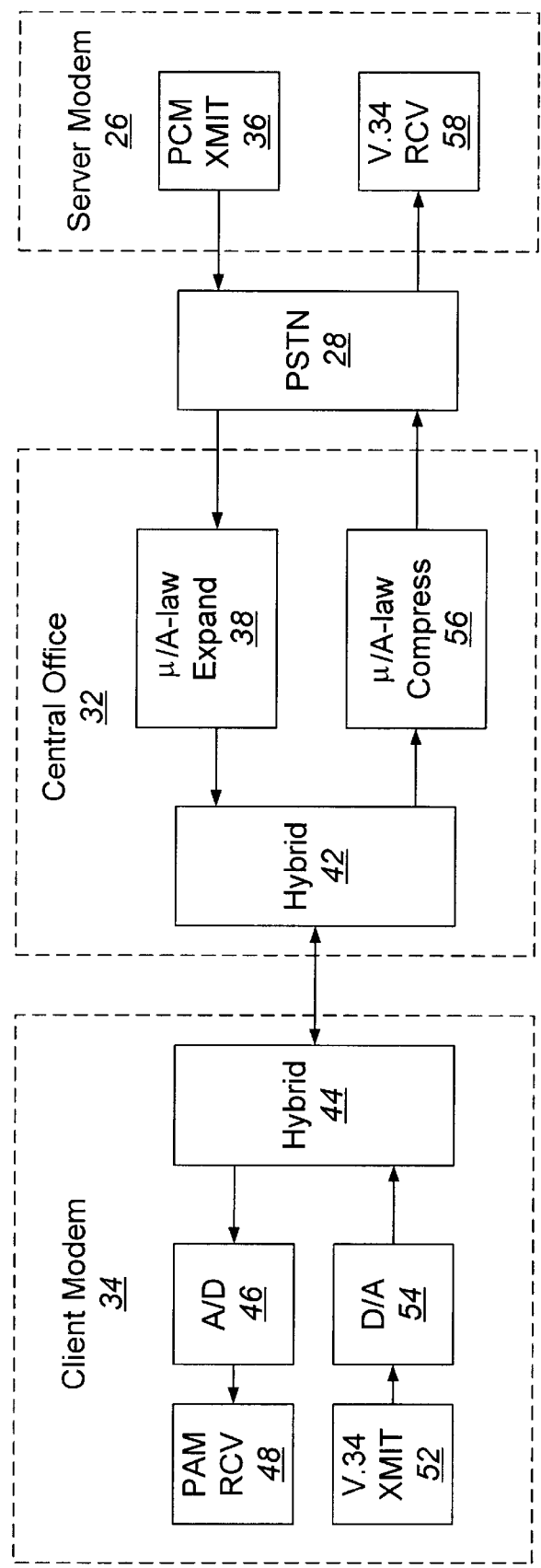
FIG. 2 is a block diagram that illustrates an internal architecture of a client modem, a central office, and a server modem shown in FIG. 1 and connections therebetween.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

The present invention may be embodied as a glitch filter, a method, or a computer program product. Accordingly, the present invention may take the form of an entirely hardware embodiment, an entirely software (including firmware, resident software, micro-code, etc.) embodiment, or an embodiment containing both software and hardware aspects. Furthermore, the present invention may take the form of a computer program product on a computer-usable or computer-readable storage medium having computer-usable program code means embodied in the medium for use by or in connection with an instruction execution system. In the context of this document, a computer-usable or computer-readable medium may be any means that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention may be written in a high level programming language such as C or C++. Some modules or routines, however, may be written in assembly language, machine language, or micro-code to optimize speed, memory usage, or layout of the software or firmware in memory. In a preferred embodiment, the present invention uses micro-code to implement most software programs. It should further be understood that the program code for carrying out operations of the present invention may also execute entirely on a client modem, partly on a client modem, partly on a client modem and partly on a server modem, or partly in a client modem, partly in a server modem, and partly in the PSTN.

Figure 3:
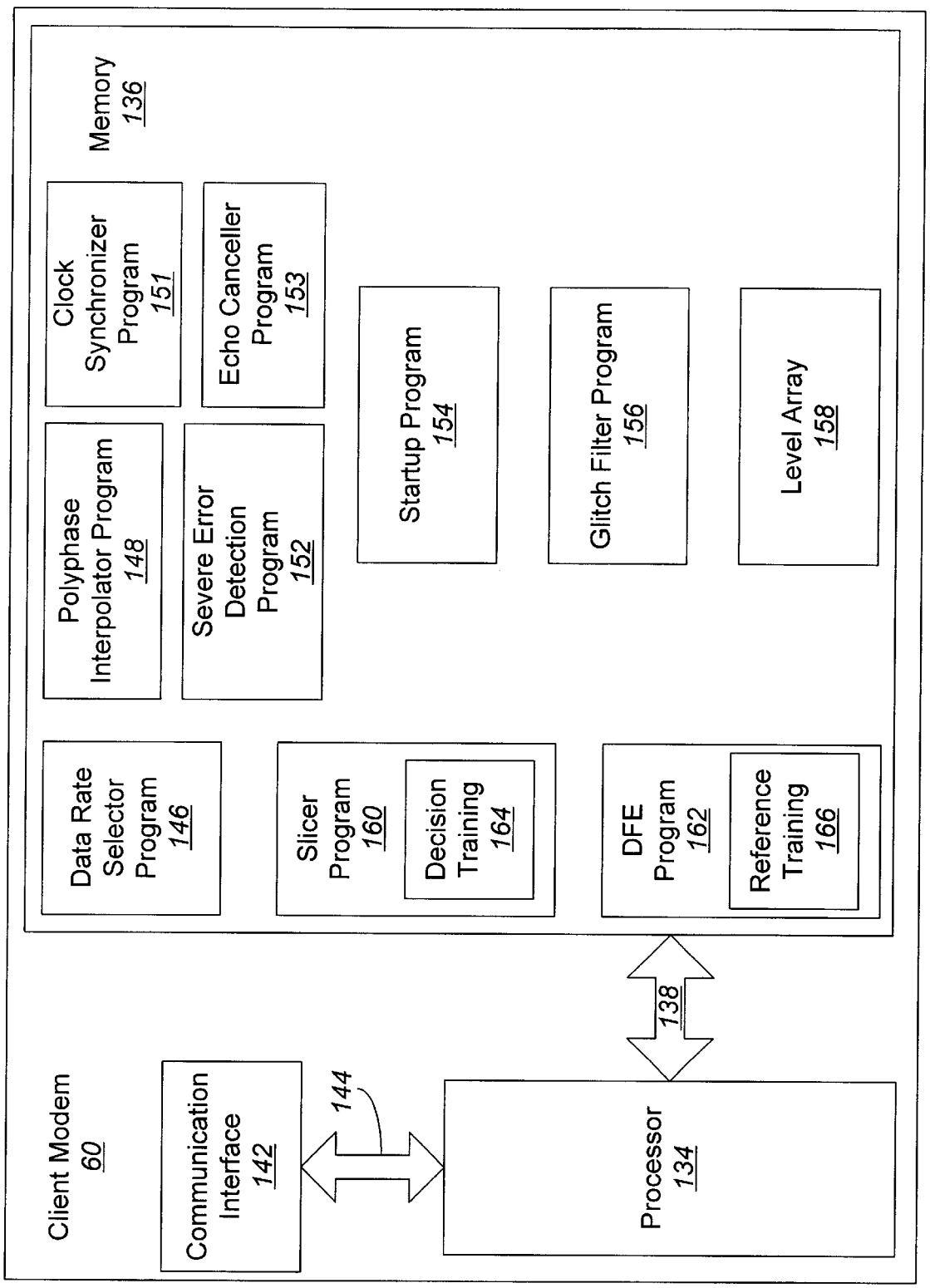
FIG. 3 is a block diagram illustrating a client modem incorporating a glitch filter according to the present invention.

Referring now to FIG. 3, FIG. 3 illustrates a client modem 60 incorporating a glitch filter of the present invention. The client modem 60 includes a processor 134, preferably a digital signal processor, which communicates with a memory 136 via an address/data bus 138. In addition, the processor 134 may receive and transmit information to external devices via a communication interface 142, which is accessed through an input/output (I/O) bus 144. The processor 134 may be any commercially available or custom processor suitable for a real-time intensive embedded application. The memory 136 is representative of the overall hierarchy of memory devices containing the software and data used to implement the functionality of the V.90 client modem 60. The memory 136 may include, but is not limited to, the following types of devices: cache, ROM, PROM, EPROM, EEPROM, flash, SRAM, and DRAM.

As shown in FIG. 3, the memory 136 can include program modules for implementing the functionality of the components of the client modem 60. Preferably, the memory 136 can include a data rate selector program module 146, a polyphase interpolator program module 148, a clock synchronizer program module 151, a severe error detector program module 152, an echo canceller program module 153, a slicer program module 160, and a Decision Feedback Equalizer (DFE) program module 162. The slicer program module 160 and the DFE program module 162 preferably include a decision training program sub-module 164 and a reference training program sub-module 166 respectively, which are used for signaling alphabet identification. Each of these program modules and sub-modules need not be described further herein for a clear understanding of the present invention.

As shown in FIG. 3, the memory 136 includes program modules for implementing the functionality of glitch filter according to the present invention. That is, the memory 136 preferably includes a modem startup program module 154 and a glitch filter program module 156. Preferably, the client modem 60 also includes an array of measured PCM code point levels, such as illustrated in Tables 1 and 2, which are generated by the modem startup program module 154. The modem startup program module 154 preferably carries out the startup procedures described in the ITU-T V.90 modem specification, including, for example, phases 1 through 4 of the startup procedure. The glitch filter program module preferably carries out the operations described below with reference to FIG. 4.

As briefly described above, during phase 3 of the V.90 startup procedure, multiple repetitions of each level of the PCM code points for each of 6 framing intervals are transmitted from the server modem to the client modem 60. The client modem acquires these levels and averages the multiple levels for the 6 framing intervals. Preferably, the PCM code point levels are sent in a manner which avoids levels for adjacent PCM code points being sent consecutive in time so as to reduce the impact of a noise spike. Furthermore, it is preferred that the levels of the PCM code points for each frame interval be an average of multiple repetitions of the levels. These PCM code point levels may then be processed as described herein to remove glitches resulting from noise spikes in the measured levels. Such an input array is illustrated in FIG. 3 as Level Array 158. An example of the type of data which may be stored in the level array 158 is illustrated in Table 2.

The present invention may, for example, be incorporated into modems 60 such as described in U.S. patent application Ser. No. 09/430,603, entitled SYSTEMS, METHODS AND COMPUTER PROGRAM PRODUCTS FOR AVERAGING LEARNED LEVELS IN THE PRESENCE OF ROBBED BIT SIGNALING BASED ON PROXIMITY, U.S. patent application Ser. No. 09/431,564, entitled SYSTEMS, METHODS AND COMPUTER PROGRAM PRODUCTS FOR AVERAGING LEARNED LEVELS IN THE PRESENCE OF DIGITAL IMPAIRMENTS BASED ON PATTERNS, U.S. Pat. No. 6,661,847, entitled SYSTEMS, METHODS AND COMPUTER PROGRAM PRODUCTS FOR GENERATING AND OPTIMIZING SIGNAL CONSTELLATIONS, U.S. patent application Ser. No. 09/429,862, entitled SYSTEMS, METHODS AND COMPUTER PROGRAM PRODUCTS FOR IDENTIFYING DIGITAL IMPAIRMENTS IN MODEM SIGNALS USING SIGNATURE ANALYSIS AND SIGNAL LEVEL COMPARISON ANALYSIS, U.S. patent application Ser. No. 09/430,217, entitled SYSTEMS, METHODS AND COMPUTER PROGRAM PRODUCTS FOR IDENTIFYING DIGITAL IMPAIRMENTS IN MODEMS BASED ON CLUSTERS AND/OR SKIPS IN PULSE CODE MODULATION SIGNAL LEVELS, U.S. Pat. No. 6,650,657, entitled SYSTEMS, METHODS AND COMPUTER PROGRAM PRODUCTS FOR IDENTIFYING DIGITAL IMPAIRMENTS IN MODEM SIGNALS, U.S. Pat. No. 6,662,322, entitled SYSTEMS, METHODS AND COMPUTER PROGRAM PRODUCTS FOR CONTROLLING THE ERROR RATE IN A COMMUNICATION DEVICE BY ADJUSTING THE DISTANCE BETWEEN SIGNAL CONSTELLATION POINTS, U. S. patent application Ser. No. 09/430,697, entitled SYSTEMS, METHODS, AND COMPUTER PROGRAM PRODUCTS FOR GENERATING A DIGITAL IMPAIRMENT LEARNING SIGNAL HAVING LOW ENERGY CONTENT AT DIRECT CURRENT AND NYQUIST FREQUENCIES, U.S. patent application Ser. No. 09/430,678, entitled MODEMS HAVING A DUAL POWER MODE CAPABILITY AND METHODS OF OPERATING SAME, and U.S. patent application Ser. No. 09/430,341, entitled SYSTEMS, METHODS, AND COMPUTER PROGRAM PRODUCTS FOR CONTROLLING DATA RATE REDUCTIONS IN A COMMUNICATION DEVICE BY USING A PLURALITY OF FILTERS TO DETECT SHORT-TERM BURSTS OF ERRORS AND LONG-TERM SUSTAINABLE ERRORS, the disclosures of which are incorporated herein by reference as if set forth fully herein.

Figure 4:
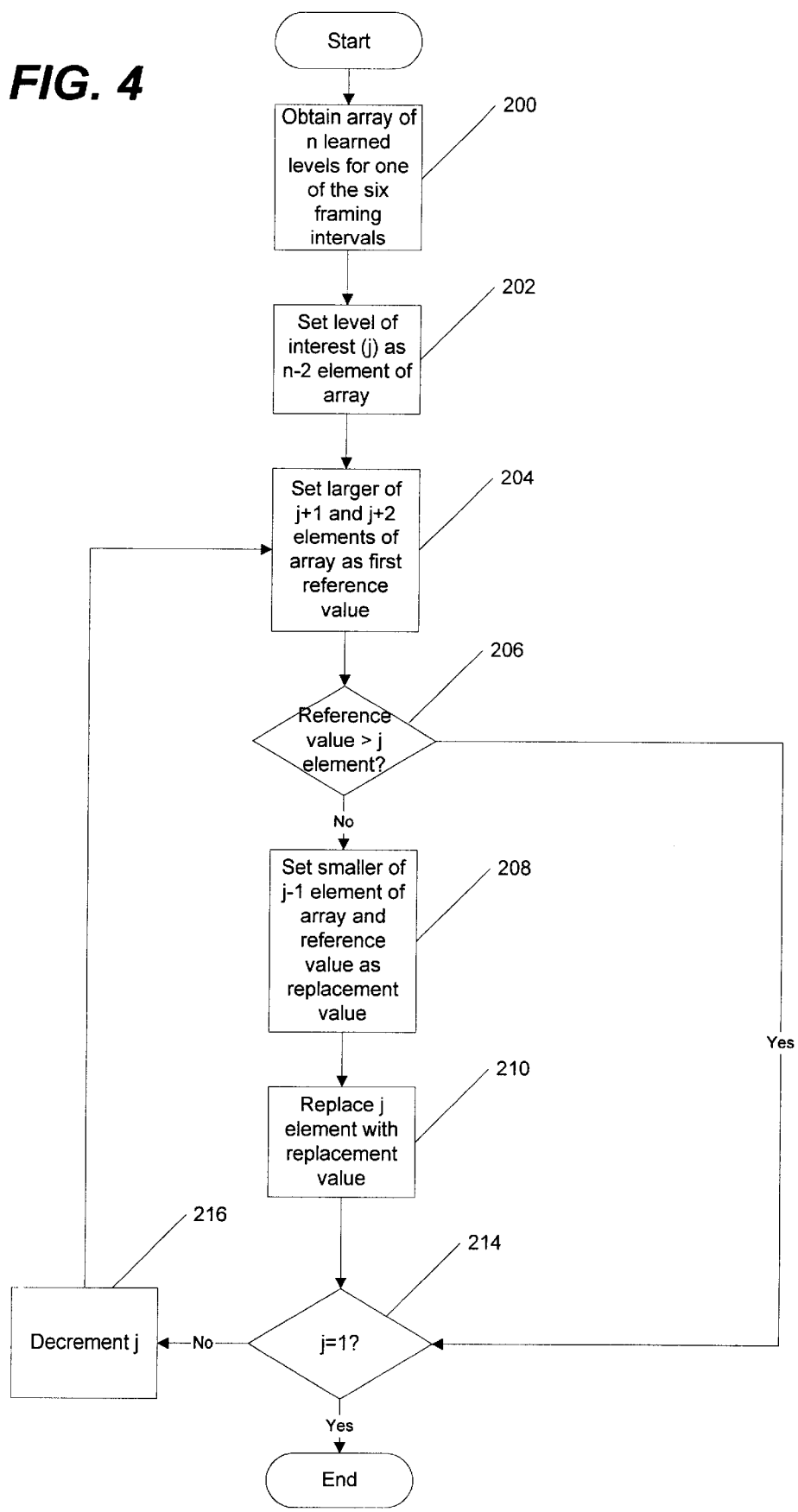
FIG. 4 is a flowchart that illustrates filtering operations in accordance with the present invention.

The glitch filter program 156 according to the present invention utilizes knowledge of the general monotonic characteristic of a log PCM curve as defined in ITU-T recommendation G.711 to detect and remove glitches. However, the glitch filter tolerates deviations from monotonic behavior which may result from robbed-bit signaling in the network. The operations of the glitch filter program module 156 according to a particular embodiment of the present invention are illustrated in FIG. 4 utilizing the above described PCM code point levels as the input array. In describing the operations of the present invention, the operations will be described with reference to a single frame interval of the 6 frame intervals. Thus, an n element array, where n is the number of code points utilized (i.e. up to 128 for V.90 ) by the modem 60 is provided as the input array to the glitch filter program module 156. As will be appreciated by those of skill in the art, these operations may be repeated for each frame interval or carried out simultaneously for multiple frame intervals.

As seen in FIG. 4, operations according to the present invention begin by the glitch filter program module 156 obtaining the n-element array of learned levels for an interval of a frame (block 200). Such an operation may be performed by accessing the Level Array 158. The array is then evaluated code point by code point beginning with the third from the highest code point. Thus, as seen in block 202, a code point of interest which may be denoted by the index value j, is set to the n−2 element of the array. The next two higher code points in the array (j+1 and j+2) are then evaluated and a first reference value set to the higher value of these two code points (block 204). It is then determined if the value of the $j^{th}$ code point is less than the first reference value (block 206). If so, then that $j^{th}$ element need not be replaced.

The use of the larger value of the two code points higher than the code point being evaluated may allow for the potential deviation in monotonic behavior as a result of robbed-bit signaling in the present of noise. Robbed-bit signaling may alter one or more of the six frame intervals. For example, when simple robbed-bit signaling exists in a network connection, each frame interval affected by robbed-bit signaling will be altered such that the level associated with each odd code point is forced to the level associated with the even code point just below. The result is that for these intervals, the sequence of values will include pairs of points with the same level. When noise is applied to these levels it is as likely that the second point in the pair is slightly smaller than the first point in the pair as it is that the second point is slightly larger than the first point. Thus, depending on how the noise alters these levels, they may or may not strictly adhere to a monotonically increasing characteristic. By choosing the larger value for the two code points above the current code point of interest, it may be guaranteed that for anything other than a major noise spike, the level of the code point of interest will be lower. The use of the two code points above the code point of interest also provides a nearly monotonically increasing sequence with other robbed-bit signaling types, such as zero robbed-bit signaling, with or without digital attenuation pads.

Returning to FIG. 4, if the reference value is not greater than the value of the $j^{th}$ element of the array (block 206), then a replacement value is set to the smaller of the value of the code point immediately below the code point of interest (i.e. the j−1 element of the array) and the reference value (block 208). The $j^{th}$ element of the array is then replaced with the replacement value (block 210).

In any event, after processing is completed for the code point of interest, either through block 206 or block 210, it is determined if the code point of interest was the lowest code point for the array (i.e. j=1) (block 214). If so, then the processing for the array is completed. If not, then the value of j is decremented (block 216) and processing continues at block 204. As will be appreciated by those of skill in the art, if j=1, then the setting of the replacement value in block 208 may be accomplished by setting the replacement value to the value of the reference value as there is no j−1 element in the array.

The replacement value is set to the smaller of the value of the code point immediately below the code point of interest and the reference value so as to protect against the possibility that the code point below the code point of interest has been corrupted by a large noise spike. In this case, the value of the code point of interest will be capped by the value of the code points above it and the next iteration will correct for the noise spike of the code point below the code point of interest.

During processing, diagnostic information may be accumulated, such as the number of times a value of a code point is altered. This diagnostic information may then be provided for subsequent analysis.

An example of the operations of the present invention may be illustrated with reference to the measured values learned for the sequence of code points from 39 through 43 as described in Table 3 below.

TABLE 3

Exemplary Code Point Measured Values With Noise Glitch

| Code Point | Measured Value |
|---|---|
| 39 | 620 |
| 40 | 15652 |
| 41 | 684 |
| 42 | 716 |
| 43 | 748 |

Utilizing the values in Table 3 and starting processing at the code point of interest as code point 41 (i.e. j=41), then for code point 41 the levels for 42 and 43 are read and compared. The larger of the two values is selected as the first reference value which would be 748. This value is then compared with the value for code point 41. Because the value for the code point of interest is less than the reference value (i.e. 684<748) then processing for code point 41 is complete and the next code point of interest (i.e. j=40) is processed.

For code point 40, the values of code points 41 and 42 are obtained and compared. The larger of the two values is selected as the first reference value which would be 716. This value is then compared with the value for code point 40 which is 15652. Because the value for the code point of interest is greater than the reference value, processing continues. The reference value is then compared with the value for the code point below the code point of interest which is code point 39 and the smaller of the two values selected as the replacement value. Thus, the value for code point 39 would be selected and the replacement value would be set to 620. The value of the code point of interest may then be set to the replacement value. Thus, the value of code point 40 would be set to 620. Processing would then continue with the next lower code point (i.e. code point 39).

For code point 39, the values for the code points for 40 and 41 are read and compared. However, the replaced value for code point 40 is utilized. The larger of the two values is selected as the first reference value which would be 684. This value is then compared with the value for code point 39. Because the value for the code point of interest is less than the reference value (i.e. 620<684) then processing for code point 39 is complete and the next code point of interest is processed. Thus, after the above processing, the code point levels would be as illustrated in Table 4 below.

TABLE 4

Exemplary Code Point Measured Values After Filtering

| Code Point | Measured Value |
|---|---|
| 39 | 620 |
| 40 | 620 |
| 41 | 684 |
| 42 | 716 |
| 43 | 748 |

In one embodiment of the present invention, the glitch filter may be implemented in assembly language code. The assembly language code may take the form of the following code.

```
_learnedlvl_filter      equ *
r2=#6                   r6=r6^~r6           ;inner loop control
r5=UMAX(r4)                                 ;largest ucode
r4=&(digimp_data+Learned___lvl_0) (r4)      ;ptr to beginning of learned
                                             levels
            r5=r5+r6                        ;UMAX-1
            r4=r4+r5                        ;do it twice for byte
                                             addressing
r1=#2                   r4=r4+r5            ;point to 3rd largest DIL
                                             level in 1st interval
r0=systmp3                                  ;ptr to V34 data
_learnedlvl_fltr_loop equ *
    r1=2 (r4)                               ;DIL level which is 1 posi-
                                             tion larger
    r3=4 (r4)           r6=r6^~r6           ;DIL level which is 2
                                             positions larger
            r3=|r3| max |r1|                ;Use larger of two levels
    r1=0 (r4)                               ;current DIL level
    r4=&2*(MTRN1D+NDTLMAX) (r4) r1-r3 ; is current pointer too
    big?;point to next interval
    bn skip_dil_fixup                       ;if not skip fixup.
    r6=(-2-2*(MTRN1D+NDILMAX)) (r4)         ;DIL level which is 1 posi-
                                             tion smaller
            r3=|r3| min |r6|                ;prevent selection of current
                                             DIL level
                                            ;by making it equal to pre-
                                             vious level
            r1=|r1| min |r3|                ;prevent current DIL level
                                             from being too large
    r6=(-2* (MTRN1D+NDILMAX)) (r4)          ;current DIL level
            r6=r6-r1                    ;amount of change in dil level
    r3=dil_change_max(r0)                   ;previous largest change
            r3=|r3| max |r6|                ;is current change largest?
    dil_change_max(r0)=r3                   ;update largest change
    r3=dil_change_count (r0)                ;previous count of dil
                                             fixups
            r3=r3+1                         ;increment count
    dil_change_count (r0)=r3                ;update count of dil fixups
_skip_dil_fixup equ *
            r6=r6^~r6                       ;loop decr
            r2=r2+r6                        ;decr loop count
    bp_learnedlvl_fltr_loop r1=|r1|         ;repeat for each of the 6
                                             intervals
                                            ;ensure using a positive
                                             level.
    -2*(MTRN1D+NDILMAX) (r4)=r1             ;save limited DIL level
    r4=& (-2-2*6*(MTRN1D+NDILMAX))          ;point to next lowest level
    (r4)                                     in 1 interval
            r6=r6^~r6                       ;restore loop decr
    r2=#6               r5=r5+r6            ;refresh inner loop count;
                                             decr outer loop cnt
    bp_learnedlvl_fltr_loop                 ;repeat for each ucode
    cdb=r7                                  ;return address
    b 0(cdb)                                ;return to caller
            nop
```

The present invention has been described herein with reference to flowchart and/or block diagram illustrations of methods, apparatus (systems), and computer program products according to an embodiment of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

It should also be understood that while the glitch filter 156 is described herein in the context of a V.90 modem receiver, the principles are applicable, in general, to any array or monotonically increasing values which may be corrupted by noise spikes, whether the array is utilized in a modem receiver or other digital signal processing system.

The flowchart of FIG. 4 illustrates the architecture, functionality, and operation of a possible implementation of the client modem receiver software. In this regard, each block represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

While the present invention has been illustrated and described in detail in the drawings and foregoing description, it is understood that the embodiments shown are merely exemplary. Moreover, it is understood that many variations and modifications can be made to the embodiments described hereinabove without substantially departing from the principles of the present invention. All such variations and modifications are intended to be included herein within the scope of the present invention, as set forth in the following claims.

That which is claims is:

1. A method of filtering noise from measured values associated with a sequence of code points, comprising the steps of:

evaluating measured values associated with two code points in the sequence of code points which are immediately higher in the sequence of code points than a current code point of interest in the sequence of code points so as to select a larger value of the two code points in the sequence as a first reference value;

comparing the first reference value with a measured value associated with a code point in the sequence of code points immediately lower than the current code point of interest to determine if the first reference value is smaller than the measured value associated with the code point in the sequence of code points immediately lower than the current code point of interest;

selecting the smaller of the first reference value and the measured value associated with a code point in the sequence of code points immediately lower than the current code point of interest so as to provide a first replacement value; and replacing the measured value associated with the current code point of interest with the first replacement value if the first reference value is smaller than the measured value associated with the current code point of interest.

2. A method according to claim 1, wherein the step of evaluating is followed by the steps of:

comparing the first reference value with the measured value of the current code point of interest so as to determine if the measured value of the current code point of interest is less than the first reference value; and establishing a new code point of interest for a subsequent evaluation which is a code point of interest lower than the current code point of interest without replacing the measured value of the current code point of interest if the measured value of the current code point of interest is less than the first reference value.

3. A method according to claim 2, wherein the new code point of interest is a code point of the sequence of code points immediately lower than the current code point of interest of the sequence of code points.

4. A method according to claim 2, further comprising the step of iteratively decreasing the current code point of interest until a lowest code point of the sequence of code points is reached.

5. A method according to claim 1, wherein the sequence of code points comprises Pulse Code Modulation (PCM) code points of a modem.

6. A method according to claim 5, wherein the sequence code points comprise a plurality of sequences corresponding to a plurality of framing intervals.

7. A method according to claim 6, wherein the steps of evaluating, selecting, comparing and replacing are carried out for each of the plurality of sequences.

8. A system for filtering noise from measured values associated with a sequence of code points, comprising:

means for evaluating measured values associated with two code points in the sequence of code points which are immediately higher in the sequence of code points than a current code point of interest in the sequence of code points so as to select a larger value of the two code points in the sequence as a first reference value;

means for comparing the first reference value with a measured value associated with a code point in the sequence of code points immediately lower than the current code point of interest to determine if the first reference value is smaller than the measured value associated with the code point in the sequence of code points immediately lower than the current code point of interest;

means for selecting the smaller of the first reference value and the measured value associated with a code point in the sequence of code points immediately lower than the current code point of interest so as to provide a fist replacement value; and means for replacing the measured value associated with the current code point of interest with the first replacement value if the first reference value is smaller than the measured value associated with the current code point of interest.

9. A system according to claim 8, further comprising:

means for comparing the first reference value with the measured value of the current code point of interest so as to determine if the measured value of the current code point of interest is less than the first reference value; and means for establishing a new code point of interest for subsequent evaluation which is a code point of interest lower than the current code point of interest without replacing the measured value of the current code point of interest if the measured value of the current code point of interest is less than the first reference value.

10. A system according to claim 9, wherein the new code point of interest is a code point of the sequence of code points immediately lower than the current code point of interest of the sequence of code points.

11. A system according to claim 9, further comprising means for iteratively decreasing the current code point of interest until a lowest code point of the sequence of code points is reached.

12. A system according to claim 8, wherein the sequence of code points comprises Pulse Code Modulation (PCM) code points of a modem.

13. A system according to claim 12, wherein the sequence code points comprise a plurality of sequences corresponding to a plurality of framing intervals.

14. A computer program product for filtering noise from measured values associated with a sequence of code points, comprising:

computer-readable program code for evaluating measured values associated with two code points in the sequence of code points which are immediately higher in the sequence of code points than a current code point of interest in the sequence of code points so as to select a larger value of the two code points in the sequence as a first reference value;

computer-readable program code for comparing the first reference value with a measured value associated with a code point in the sequence of code points immediately lower than the current code point of interest to determine if the first reference value is smaller than the measured value associated with the code point in the sequence of code points immediately lower than the current code point of interest;

computer-readable program code for selecting the smaller of the first reference value and the measured value associated with a code point in the sequence of code points immediately lower than the current code point of interest so as to provide a first replacement value; and computer-readable program code for replacing the measured value associated with the current code point of interest with the first replacement value if the first reference value is smaller than the measured value associated with the current code point of interest.

15. A computer program product according to claim 14, further comprising:

computer-readable program code for comparing the first reference value with the measured value of the current code point of interest so as to determine if the measured value of the current code point of interest is less than the first reference value; and computer-readable program code for establishing a new code point of interest for subsequent evaluation which is a code point of interest lower than the current code point of interest without replacing the measured value of the current code point of interest if the measured value of the current code point of interest is less than the first reference value.

16. A computer program product according to claim 15, wherein the new code point of interest is a code point of the sequence of code points immediately lower than the current code point of interest of the sequence of code points.

17. A computer program product according to claim 15, further comprising computer-readable program code for iteratively decreasing the current code point of interest until a lowest code point of the sequence of code points is reached.

18. A computer program product according to claim 14, wherein the sequence of code points comprises Pulse Code Modulation (PCM) code points of a modem.

19. A computer program product according to claim 18, wherein the sequence code points comprise a plurality of sequences corresponding to a plurality of framing intervals.

\* \* \* \* \*